United States Patent
Wu et al.

(10) Patent No.: US 9,264,658 B2
(45) Date of Patent: Feb. 16, 2016

(54) IMPLEMENTING CHANNEL START AND FILE SEEK FOR DECODER

(71) Applicant: Microsoft Corporation, Redmond, WA (US)

(72) Inventors: Yongjun Wu, Bellevue, WA (US); Gang Ji, Bothell, WA (US); Shyam Sadhwani, Bellevue, WA (US); Naveen Thumpudi, Redmond, WA (US); Eric S. Christoffersen, Beaux Arts, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 382 days.

(21) Appl. No.: 13/726,474

(22) Filed: Dec. 24, 2012

(65) Prior Publication Data
US 2013/0108248 A1 May 2, 2013

Related U.S. Application Data

(62) Division of application No. 12/505,444, filed on Jul. 17, 2009, now Pat. No. 8,340,510.

(51) Int. Cl.
*H04N 5/93* (2006.01)
*H04N 5/783* (2006.01)
(Continued)

(52) U.S. Cl.
CPC ............... *H04N 5/93* (2013.01); *H04N 5/783* (2013.01); *H04N 19/132* (2014.11); *H04N 19/159* (2014.11); *H04N 19/172* (2014.11);
(Continued)

(58) Field of Classification Search
CPC ....... H04N 5/783; H04N 9/80; H04N 9/8082; H04N 9/8085
See application file for complete search history.

(56) References Cited

U.S. PATENT DOCUMENTS

| | | | |
|---|---|---|---|
| 5,475,389 | A | 12/1995 | Song et al. |
| 5,568,200 | A | 10/1996 | Pearlstein et al. |

(Continued)

FOREIGN PATENT DOCUMENTS

| | | |
|---|---|---|
| WO | WO 2006/020019 | 2/2006 |
| WO | WO 2006/111063 | 10/2006 |

(Continued)

OTHER PUBLICATIONS

Bordoloi et al., "Hardware Accelerated Interactive Vector Field Visualization: A Level of Detail Approach," *Eurographics* 2002, vol. 21, No. 3, 10 pp. (2002).

(Continued)

*Primary Examiner* — Huy T Nguyen
(74) *Attorney, Agent, or Firm* — Sunah Lee; Judy Yee; Micky Minhas

(57) ABSTRACT

A video bit stream with pictures comprising inter-coded content can be decoded upon receiving a channel start or file seek instruction. Pictures for beginning decoding and display of the bit stream can be selected based at least in part on one or more tuning parameters that set a preference between a latency of beginning to display video and possible defects in the displayed video. In some embodiments, to implement decoding upon a channel start or file seek, one or more types of data are generated for one or more pictures. For example, picture order counts are generated for pictures after a channel start or file seek operation. As another example, a decoder generates a frame number value that triggers re-initialization of a reference picture buffer before decoding after a channel start or file seek operation.

20 Claims, 11 Drawing Sheets

(51) Int. Cl.

| | |
|---|---|
| *H04N 21/234* | (2011.01) |
| *H04N 21/438* | (2011.01) |
| *H04N 21/44* | (2011.01) |
| *H04N 21/485* | (2011.01) |
| *H04N 19/159* | (2014.01) |
| *H04N 19/70* | (2014.01) |
| *H04N 19/172* | (2014.01) |
| *H04N 19/61* | (2014.01) |
| *H04N 19/132* | (2014.01) |
| *H04N 19/44* | (2014.01) |
| *H04N 19/89* | (2014.01) |

(52) U.S. Cl.
CPC .............. *H04N 19/44* (2014.11); *H04N 19/61* (2014.11); *H04N 19/70* (2014.11); *H04N 19/89* (2014.11); *H04N 21/23424* (2013.01); *H04N 21/4384* (2013.01); *H04N 21/44016* (2013.01); *H04N 21/485* (2013.01)

(56) References Cited

U.S. PATENT DOCUMENTS

| | | | |
|---|---|---|---|
| 5,650,781 | A | 7/1997 | Park |
| 5,724,446 | A | 3/1998 | Liu et al. |
| 6,005,982 | A | 12/1999 | Abe |
| 6,151,034 | A | 11/2000 | Jain |
| 6,272,180 | B1 | 8/2001 | Lei |
| 6,275,239 | B1 | 8/2001 | Ezer et al. |
| 6,275,964 | B1 | 8/2001 | Nagin et al. |
| 6,323,904 | B1 | 11/2001 | Knee |
| 6,404,817 | B1 | 6/2002 | Saha et al. |
| 6,417,910 | B1 | 7/2002 | Mead |
| 6,470,049 | B1 | 10/2002 | Nguyen |
| 6,522,694 | B1 | 2/2003 | Ryan |
| 6,748,020 | B1 | 6/2004 | Eifrig et al. |
| 6,763,192 | B1 | 7/2004 | Jagannathan |
| 6,993,202 | B2 | 1/2006 | Igarashi et al. |
| 7,068,722 | B2 | 6/2006 | Wells |
| 7,113,542 | B2 | 9/2006 | Tanaka |
| 7,149,247 | B2 | 12/2006 | Sullivan |
| 7,184,100 | B1 | 2/2007 | Wilf et al. |
| 7,496,282 | B2 | 2/2009 | Kochale |
| 7,500,240 | B2 | 3/2009 | Shoemaker |
| 7,707,334 | B2 | 4/2010 | Wang et al. |
| 7,742,532 | B2 | 6/2010 | Jeon |
| 7,751,473 | B2 | 7/2010 | Hannuksela |
| 7,792,374 | B2 | 9/2010 | Ohira |
| 8,300,702 | B2 * | 10/2012 | Yamazaki ................ 375/240.25 |
| 2002/0069038 | A1 | 6/2002 | Cooper |
| 2002/0141502 | A1 | 10/2002 | Lin et al. |
| 2003/0112333 | A1 | 6/2003 | Chen et al. |
| 2003/0156652 | A1 | 8/2003 | Wise et al. |
| 2004/0032908 | A1 | 2/2004 | Hagai et al. |
| 2004/0047614 | A1 | 3/2004 | Green |
| 2004/0101055 | A1 | 5/2004 | Hourunranta |
| 2004/0139462 | A1 | 7/2004 | Hannuksela et al. |
| 2004/0179619 | A1 | 9/2004 | Tian et al. |
| 2004/0185775 | A1 | 9/2004 | Bell et al. |
| 2004/0190617 | A1 | 9/2004 | Shen et al. |
| 2004/0247030 | A1 | 12/2004 | Wiethoff |
| 2004/0258151 | A1 | 12/2004 | Spampinato |
| 2005/0025463 | A1 | 2/2005 | Bloom et al. |
| 2005/0089104 | A1 | 4/2005 | Kim |
| 2005/0094729 | A1 | 5/2005 | Yuan et al. |
| 2005/0123057 | A1 | 6/2005 | MacInnis et al. |
| 2005/0232359 | A1 | 10/2005 | Cha |
| 2005/0278502 | A1 | 12/2005 | Hundley |
| 2006/0002479 | A1 | 1/2006 | Fernandes |
| 2006/0013318 | A1 | 1/2006 | Webb et al. |
| 2006/0039475 | A1 | 2/2006 | Liu et al. |
| 2006/0045190 | A1 | 3/2006 | Sun et al. |
| 2006/0059510 | A1 | 3/2006 | Huang et al. |
| 2006/0062304 | A1 | 3/2006 | Hsia |
| 2006/0088107 | A1 | 4/2006 | Cancemi et al. |
| 2006/0098732 | A1 | 5/2006 | Bruna et al. |
| 2006/0104366 | A1 | 5/2006 | Huang et al. |
| 2006/0133770 | A1 * | 6/2006 | Shibata et al. ................ 386/68 |
| 2006/0146940 | A1 | 7/2006 | Gomila et al. |
| 2006/0233239 | A1 | 10/2006 | Sethi et al. |
| 2006/0251177 | A1 | 11/2006 | Webb |
| 2007/0014359 | A1 | 1/2007 | Gomila et al. |
| 2007/0030911 | A1 | 2/2007 | Yoon |
| 2007/0033494 | A1 | 2/2007 | Wenger et al. |
| 2007/0053445 | A1 | 3/2007 | Schaar et al. |
| 2007/0073779 | A1 | 3/2007 | Walker et al. |
| 2007/0086526 | A1 | 4/2007 | Koto et al. |
| 2007/0091997 | A1 | 4/2007 | Fogg et al. |
| 2007/0098080 | A1 | 5/2007 | Diard et al. |
| 2007/0116128 | A1 | 5/2007 | Evans et al. |
| 2007/0153898 | A1 | 7/2007 | Yim |
| 2007/0177678 | A1 | 8/2007 | Subramania et al. |
| 2007/0211055 | A1 | 9/2007 | Stein et al. |
| 2007/0223595 | A1 | 9/2007 | Hannuksela |
| 2007/0242080 | A1 | 10/2007 | Hamada |
| 2008/0002773 | A1 | 1/2008 | Lai |
| 2008/0049844 | A1 | 2/2008 | Liu et al. |
| 2008/0049845 | A1 | 2/2008 | Liu |
| 2008/0107184 | A1 | 5/2008 | Katsavounidis et al. |
| 2008/0130754 | A1 | 6/2008 | Winger |
| 2009/0052858 | A1 | 2/2009 | Date |
| 2009/0074075 | A1 | 3/2009 | Au |
| 2009/0147854 | A1 | 6/2009 | Dane et al. |
| 2012/0147956 | A1 | 6/2012 | Katsavounidis et al. |
| 2013/0077690 | A1 | 3/2013 | Wei et al. |

FOREIGN PATENT DOCUMENTS

| | | |
|---|---|---|
| WO | WO 2006/111915 | 10/2006 |
| WO | WO 2006/134110 | 12/2006 |

OTHER PUBLICATIONS

Chung et al., "DCT Based Error Concealment for RTSP Video Over a Modem Internet Connection," *Proceedings of the 1998 IEEE International Symposium on Circuits and Systems*, 4 pp. (1998).
Digit-Life, "AMD/ATI and NVIDIA Graphics Cards in Video Decoding Tasks," Jun. 25, 2007, http://www.digit-life.com/articles2/video/video.dec.2007-page1.html, 9 pages.
Fiedler, "Implementation of a Basic H.264/AVC Decoder," Chemnitz University of Technology, Faculty of Computer Science, Seminar Paper, 28 pp., Jun. 1, 2004.
Geomantics, "GenesisIV Tutorial: Startup issues," http://www.geomantics.com/tutorial22.htm, visited on Sep. 24, 2008, 3 pages.
"H.264/MPEG-4 AVC," Wikipedia, 8 pp., May 27, 2009. http://en.wikipedia.org/wiki/H.264.
ISO/IEC, "Text of ISO/IEC 14496-10:2005/FPDAM3 Scalable Video Coding (in Integrated Form with ISO/IEC 14996-10)," ISO/IEC JTC 1/SC 29/WG 11 N8241, 552 pp. (Jul. 2006).
Lee et al., "Error-Resilient Image Coding (ERIC) with Smart-IDCT Error Concealment Technique for Wireless Multimedia Transmission," *IEEE Transactions on Circuits and Systems for Video Technology*, vol. 13, No. 2, pp. 176-181 (Feb. 2003).
Marpe, "The H.264/MPEG4 Advanced Video Coding Standard and Its Applications," IEEE Communications Magazine, Standards Report, 10 pp., Aug. 2006.
Microsoft Corporation, "Error Message: CONF Caused a Divide Error in Module Msvfw32.dll," http://support.microsoft.com/kb/263031, Oct. 2006, 2 pages.
Microsoft Corporation, "Microsoft Windows XP Professional Resource Kit, Second Edition," 28 pp. (Jun. 11, 2003).
Nemethova et al., "Flexible Error Concealment for H.264 Based on Directional Interpolation," *IEEE*, 6 pp. (2005).
Park et al., "Content-Based Adaptive Spatio-Temporal Methods for MPEG Repair," *IEEE Transactions on Image Processing*, vol. 13, No. 8, pp. 1066-1077 (Aug. 2004).
Patel et al., "Performance of a Software MPEG Video Decoder," *ACM Proc.*, 8 pp. (1993).
Shen et al., "Accelerate Video Decoding With Generic GPU," *IEEE Transactions on Circuits and Systems for Video Technology*, vol. 15, No. 5, pp. 685-693 (May 2005).

(56) References Cited

OTHER PUBLICATIONS

Sonic Solutions, "CinePlayer™ DVD Decoder Pack for Windows® XP," http://www.sonic.com/products/Consumer/CinePlayer/Technology/acceleration.aspx , visited on Sep. 24, 2008, 10 pages.

Su et al., "Improved Error Concealment Algorithms Based on H.264/AVC Non-normative Decoder," *IEEE*, 4 pp. (2004).

Sullivan, "Seven Steps Toward a More Robust Codec Design," JVT-C117, 7 pp. (May 2002).

Sullivan et al., "The H.264/AVC Advanced Video Coding Standard: Overview and Introduction to the Fidelity Range Extensions," SPIE Conference on Applications of Digital Image Processing XXVII, Special Session on Advances in the New Emerging Standard, 21 pp., Aug. 2004.

Swann, "Resilient Video Coding for Noisy Channels," *IEEE Colloquium on Data Compression: Methods and Implementations*, 5 pp. (1999).

The Elder Geek on Windows XP, "Camtasia Why Playback is Black," http://www.theeldergeek.com/forum/lofiversion/index.php?t15009.html, Dec. 2005, 5 pages.

Thomos et al., "Error-resilient transmission of H.264/AVC streams using flexible macroblock ordering," *IEEE*, 7 pp. (2005).

Wang et al., "A Platform-Based MPEG-4 Advanced Video Coding (AVC) Decoder with Block Level Pipelining," *Proceedings of the 2003 Joint Conference of the Fourth International Conference on Information, Communications and Signal Processing, and the Fourth Pacific Rim Conference on Multimedia*, vol. 1, Issue 15-18, pp. 51-55, Dec. 2003.

Wang et al., "Isolated Regions: Motivations, Problems, and Solutions," JVT-C072, 13 pp. (May 2002).

Wang et al., "Real-time Video Communications over Unreliable Networks," *IEEE Signal Processing Magazine*, vol. 17, No. 4, pp. 61-82 (Jul. 2000).

\* cited by examiner

IMPLEMENTING CHANNEL START AND FILE SEEK FOR DECODER

CROSS REFERENCE TO RELATED APPLICATIONS

This application is a divisional of U.S. patent application Ser. No. 12/505,444, filed Jul. 17, 2009, which is hereby incorporated by reference.

BACKGROUND

Digital media, such as video, is sometimes encoded such that a current portion of the encoded media refers to another portion of the encoded media. As an example of inter-picture coding, parts of a current video picture are sometimes encoded by reference to other video pictures that were previously encoded and decoded. The previously encoded/decoded pictures are termed reference pictures. Thus, decoding the current portion depends (to at least some degree) on information in the other portion.

In some cases, the other portion of the encoded media may be partially or completely unavailable. In such cases, it can be difficult or impossible to accurately decode the current portion. Such a situation can arise, for example, when encoded video is delivered over a network connection, and a user switches between channels of video (examples of channel start operations). Or, such a situation can arise, for example, when a user plays back a video file and moves forward or backward in the video (examples of file seek operations). In these scenarios, dependencies of a current video picture on unavailable reference pictures can result in failure of decoding. This can show up as missing blocks on the screen ("macroblocking") or other corruptions in one or more displayed pictures.

SUMMARY

In summary, the application presents ways to implement video decoding upon a channel start or file seek operation. In some embodiments, pictures for beginning decoding and display of the video are selected based at least in part on one or more tuning parameters. The one or more tuning parameters can be selected to set a preference in terms of a trade-off between a latency of beginning to display video and possible defects in the displayed video. In some embodiments, to implement decoding upon a channel start or file seek, one or more types of data are generated for one or more pictures. For example, display order data are generated for pictures after a channel start or file seek operation, then used in decoding of certain inter-coded content. As another example, a frame identifier value is generated that causes a gap in frame identifier values, which triggers reference picture management operations before decoding after a channel start or file seek operation.

In some embodiments, one or more computer-readable storage media contain instructions which, when executed by a processor, cause the processor to perform a method of video playback upon a channel start or file seek, the method comprising: receiving an instruction to perform a channel start or file seek for a bit stream of encoded video data, the channel start or file seek indicating a seek location; retrieving one or more tuning parameters selected to set a preference between latency of beginning to display video and possible defects in the displayed video; based at least in part on the one or more tuning parameters and the seek location, determining a start location at which to start display of pictures from the encoded video data of the bit stream; and decoding at least part of the encoded video data from the bit stream to support display of the pictures beginning from the start location. The one or more tuning parameters comprise a key picture count parameter indicating a number of pictures to potentially be searched to find a picture that lacks inter-coded content. In some cases, determining the start location includes: searching the encoded video data of the bit stream after the seek location for up to the indicated number of pictures; if the picture that lacks inter-coded content is found in the searching, setting the start location based on the picture that lacks inter-coded content; and otherwise, setting the start location based on a picture comprising inter-coded content. The number of pictures to potentially be searched can be a limited number, and the picture that lacks inter-coded content can be an instantaneous data refresh picture or other I picture.

The one or more tuning parameters comprise a display skip parameter indicating a number of pictures to be decoded but not displayed. The number of pictures indicated by the display skip parameter is selectively displayed if not corrupt, wherein the determining the start location comprises determining that at least one of the pictures contains defects, the method further comprising: as a result of the determination that at least one of the pictures contains defects, storing the at least one of the pictures with defects in a reference picture buffer after decoding without displaying the at least one of the pictures with defects. In some cases, the indicated number of pictures to be decoded but not displayed is a limited number, and wherein at least some of the pictures use references to reference pictures for inter-coded content, the reference pictures being unavailable. The one or more tuning parameters can further comprise a key picture count parameter indicating a number of pictures to potentially be searched to find a picture that lacks inter-coded content, and the determining the start location can include, after the seek location, searching the encoded video data of the bit stream for up to the number of pictures indicated by the key picture count parameter.

In further embodiments, one or more computer-readable storage media contain instructions which, when executed by a processor, cause the processor to perform a method of video playback upon a channel start or file seek, the method comprising: receiving an instruction to perform a channel start or file seek for a bit stream of encoded video data; based at least in part on the instruction to perform the channel start or file seek, generating a frame identifier value that results in a gap between frame identifier values; upon detection of the gap between frame identifier values: generating substitute data for one or more reference pictures; and marking the one or more reference pictures as non-existent for purposes of reference picture management; and decoding plural pictures after the channel start or file seek using at least part of the bit stream of encoded video data. The assigned frame identifier value is an invalid frame number, and the gap in identifier values is a gap in frame numbers, and wherein the substitute data comprise sample values for the one or more reference pictures. The method further comprises, upon detection of the gap between frame identifier values: determining a set of frame identifier values for the one or more reference pictures; for each frame identifier value in the set of identifier values, performing the generating and the marking for one of the one or more reference pictures associated with the frame identifier value, wherein the substitute data for the one or more reference pictures provide one or more placeholder representations of the one or more reference pictures, respectively, and wherein the marking of the one or more reference pictures as non-existent makes the one or more placeholder representations unavailable for reference in motion compensation during the decoding of the plural pictures after the channel start or file seek.

In additional embodiments, one or more computer-readable storage media contain instructions which, when executed by a processor, cause the processor to perform a method of video playback upon a channel start or file seek, the method comprising: receiving an instruction to perform a channel start or file seek for a bit stream of encoded video data; based at least in part on the instruction to perform the channel start or file seek, predicting display order data for one or more pictures that precede a given picture in decoding order, the one or more preceding pictures including a first decodable picture; and decoding the given picture using at least part of the encoded video data from the bit stream, wherein the given picture comprises inter-coded content encoded with bi-directional motion compensation, and wherein the decoding the given picture includes using the predicted display order data. In some cases, the predicting display order data comprises: determining a display order count for the first decodable picture, the first decodable picture being decoded after the channel start or file seek; and for each of one or more other preceding pictures of the one or more preceding pictures: adjusting the display order count; and assigning the adjusted display order count to the other preceding picture. In some cases, the predicting display order data comprises performing backward prediction from a display order count assigned to the first decodable picture, the first decodable picture being decoded after the channel start or file seek, wherein the one or more other preceding pictures further include one or more generated placeholder reference pictures. In additional embodiments, the predicting display order data is based at least in part on size for a reference picture buffer for decoded pictures. The display order data includes a picture order count for each of the one or more preceding pictures. The prediction of display order data assumes (a) that the given picture and the first decodable picture are part of a first group of pictures, and (b) that any other preceding picture is part of another group of pictures that precedes the first group of pictures and includes no pictures reordered to follow the first decodable picture in display order.

Any of the methods and computer-readable storage media disclosed herein can be implemented as part of a video playback system, wherein the video playback system is a digital video receiver, set-top box, mobile device or general purpose computer configured to perform the method.

The foregoing and other features of the disclosed technologies will become more apparent from the following detailed description, which proceeds with reference to the accompanying figures.

DETAILED DESCRIPTION

Figure 1:
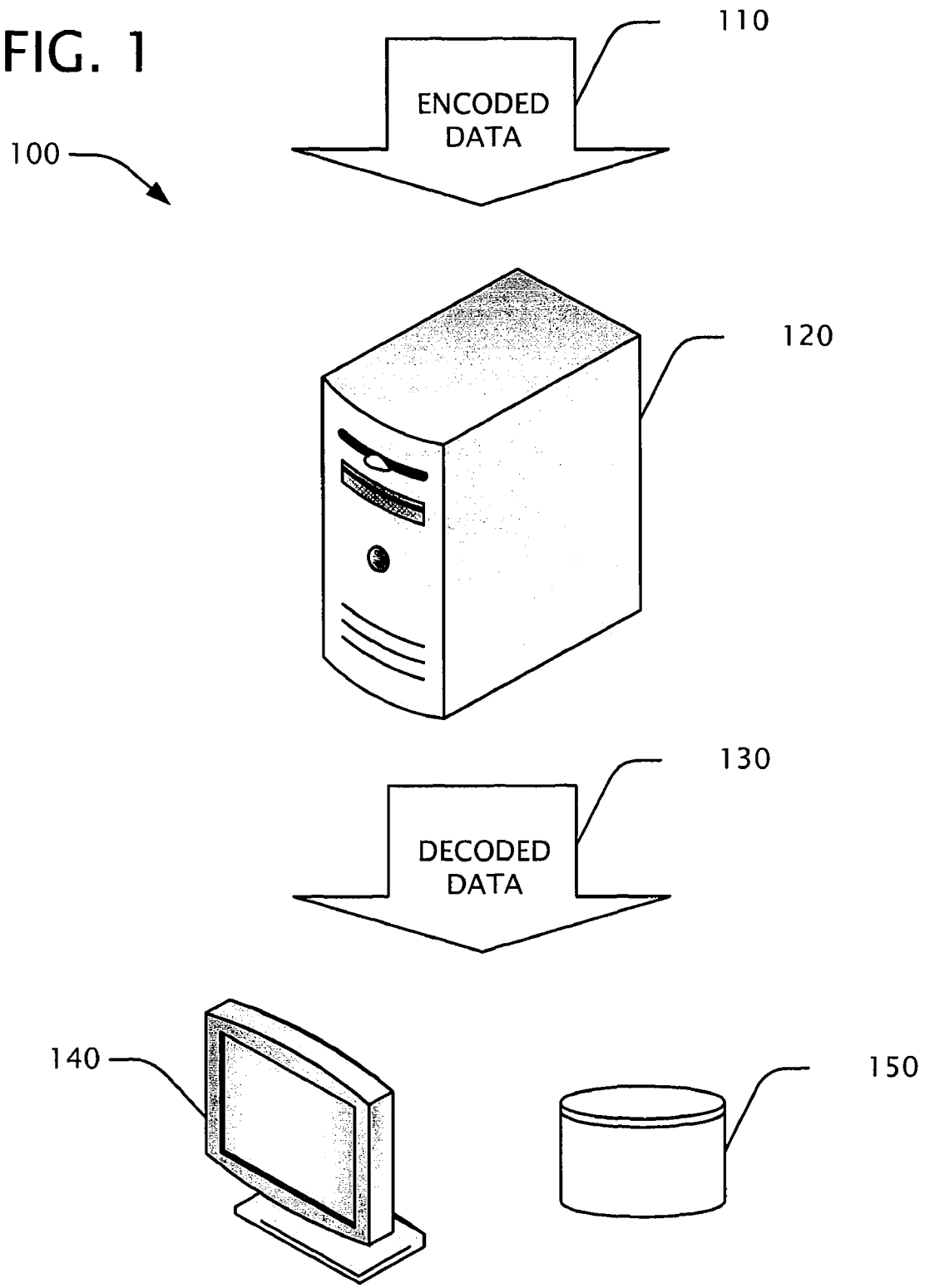
FIG. 1 shows an overview of an exemplary general-purpose computing environment for decoding video data, in conjunction with which at least some of the described embodiments can be implemented.

Disclosed below are embodiments of data decoding technologies and/or related systems and methods. The embodiments should not be construed as limiting in any way. Instead, the present disclosure is directed toward all novel and non-obvious features and aspects of the various disclosed methods and systems, and equivalents thereof, alone and in various combinations and subcombinations with one another. The methods disclosed herein are not performed purely in the human mind.

As used in this application and in the claims, the singular forms "a," "an" and "the" include the plural forms unless the context clearly dictates otherwise. Additionally, the term "includes" means "comprises." When used in a sentence, the phrase "and/or" can mean "one or more of" the elements described in the sentence. Embodiments described herein are exemplary embodiments of the disclosed technologies unless clearly stated otherwise.

Although the operations of some of the disclosed methods and systems are described in a particular, sequential order for convenient presentation, it should be understood that this manner of description encompasses rearrangement, unless a particular ordering is required by specific language set forth below. For example, operations described sequentially can in some cases be rearranged or performed concurrently.

For the sake of simplicity, the figures may not show the various ways in which the disclosed methods and systems can be used in conjunction with other methods and systems. Additionally, the description sometimes uses terms like "determine," "identify," and "retrieve" to describe the disclosed technology. These and other terms are high-level abstractions of the actual operations that are performed. The actual operations that correspond to these terms may vary depending on the particular implementation and are readily discernible by one of ordinary skill in the art.

Any of the methods described herein can be performed using software comprising computer-executable instructions stored on one or more computer-readable storage media. Furthermore, any intermediate or final results of the disclosed methods can be stored on one or more computer-readable storage media. Computer-readable storage media can include non-volatile storage such as, for example, read-only memory (ROM), flash memory, hard disk drives, floppy disks and optical disks. Computer-readable storage media can also include volatile storage such as, for example, random-access memory (RAM), device registers and processor registers. Any such software can be executed on a single computer or on a networked computer (for example, via the Internet, a wide-area network, a local-area network, a client-server network, or other such network).

The software embodiments disclosed herein can be described in the general context of computer-executable instructions, such as those included in program modules, which can be executed in a computing environment on a target real or virtual processor. Generally, program modules include routines, programs, libraries, objects, classes, components, data structures, etc., that perform particular tasks or implement particular abstract data types. The functionality of the program modules can be combined or split between program modules as desired in various embodiments. Computer-executable instructions for program modules can be executed within a local or distributed computing environment. For clarity, only certain selected aspects of the software-based implementations are described. Other details that are well known in the art are omitted. For example, it should be understood that the disclosed technologies are not limited to any specific computer language, program, or computer. For instance, the disclosed embodiments can be implemented using a wide variety of commercially available computer systems. Any of the disclosed methods can alternatively be implemented (partially or completely) in hardware (e.g., an ASIC, PLD, or SoC). Portions of one or more disclosed methods can be executed by different parts of a distributed computing environment.

Additionally, intermediate or final results (e.g., decoded media data), created or modified using any of the disclosed methods can be stored on one or more tangible computer-readable storage media In some cases, intermediate or final results (e.g., decoded media data), produced by any of the disclosed methods, can be presented to a user using a suitable device (e.g., a computer monitor). Such presentation and/or storing can be performed as part of a computer implementation of any of the disclosed methods.

Furthermore, any of the software embodiments (comprising, for example, computer-executable instructions for causing a computer to perform any of the disclosed methods) can be transmitted, received, or accessed through a suitable communication means. Similarly, intermediate or final method results, created or modified using any of the disclosed methods, can be transmitted, received, or accessed through a suitable communication means. Such suitable communication means include, for example, the Internet, the World Wide Web, an intranet, cable (including fiber optic cable), magnetic communication means, electromagnetic communication means (including RF, microwave, and infrared communications), electronic communication means, or other such communication means. Such communication means can be, for example, part of a shared or private network.

At least some of the embodiments disclosed herein are described with respect to video decoding. However, at least some technologies described herein can also be used for decoding other types of data.

Some of the techniques and tools described herein address one or more of the problems noted in the Background. Typically, a given technique/tool does not solve all such problems, however. Rather, in view of constraints and tradeoffs in decoding time and/or resources, the given technique/tool improves performance for a particular implementation or scenario.

General-Purpose Computing Environment

FIG. 1 shows an exemplary general-purpose computing environment for decoding data, for example, decoding video data. Encoded data 110 (e.g., encoded video data) is provided to a computer 120. The computer 120 processes and transforms the encoded data 110 into decoded data 130 (e.g., decoded video data). In some cases, the decoded data 130 can be displayed on a display 140 (e.g., as one or more video images) and/or stored in one or more computer-readable storage media 150. The one or more computer-readable storage media 150 can also store the encoded data 110 for later decoding and playback.

Example Types of Pictures

Figure 2:
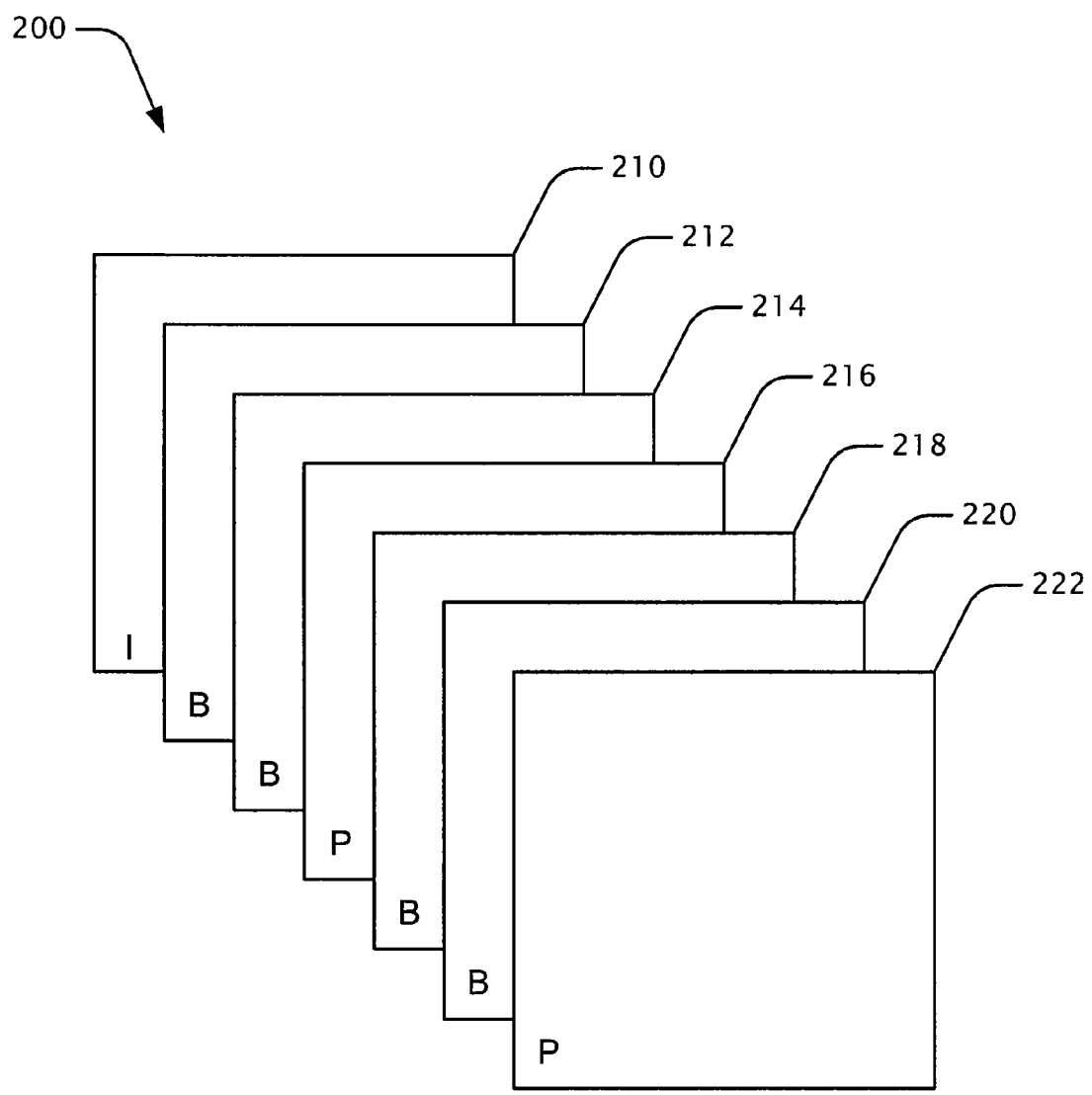
FIG. 2 shows an example of a plurality of pictures in a video sequence.

FIG. 2 shows an exemplary set 200 of pictures in a stream of coded video data. In the depicted example, the set 200 comprises pictures 210, 212, . . . , 222. The video stream can be coded according to a standard (e.g., H.264/AVC, MPEG-2, SMPTE 421M or another standard). In the depicted example, the picture 210 is an "I" picture that does not comprise inter-coded content that references other pictures; instead, it contains only intra-coded content that refers to data elsewhere in the same picture. I pictures and other pictures with only intra-coded content are sometimes called "key pictures."

The pictures 216, 222 are "P" pictures. A P picture comprises content that is inter-coded relative to one or more other pictures, with any given part of the P picture (e.g., sub-block, block, macroblock) having its own motion vector being "uni-directionally" predicted from one other picture. That is, at least some content of these P pictures is predicted from (e.g., motion compensated at least in part with reference to) one or more previously encoded/decoded pictures that precede or follow the P picture in display order. A P picture can also include parts that are intra-picture coded.

The pictures 212, 214, 218, 220 are "B" pictures. A B picture includes content that is inter-coded relative to one or more other pictures, with any given part of the B-picture (e.g., sub-block, block, macroblock) having its own motion vector being "bi-directionally" predicted from up to two other pictures before or after the current B picture in display order, if inter-picture prediction is used. A B picture can also include parts that are intra-coded or inter-coded uni-directionally relative to one reference picture. Pictures comprising inter-coded content are sometimes called "predicted pictures."

In some embodiments, the set 200 of pictures is called a "Group of Pictures" (GOP). In further embodiments, additional types of pictures exist in the set 200. These different types of pictures can comprise content with varying levels of inter-picture coding or intra-picture coding.

Example Decoders

Figure 3:
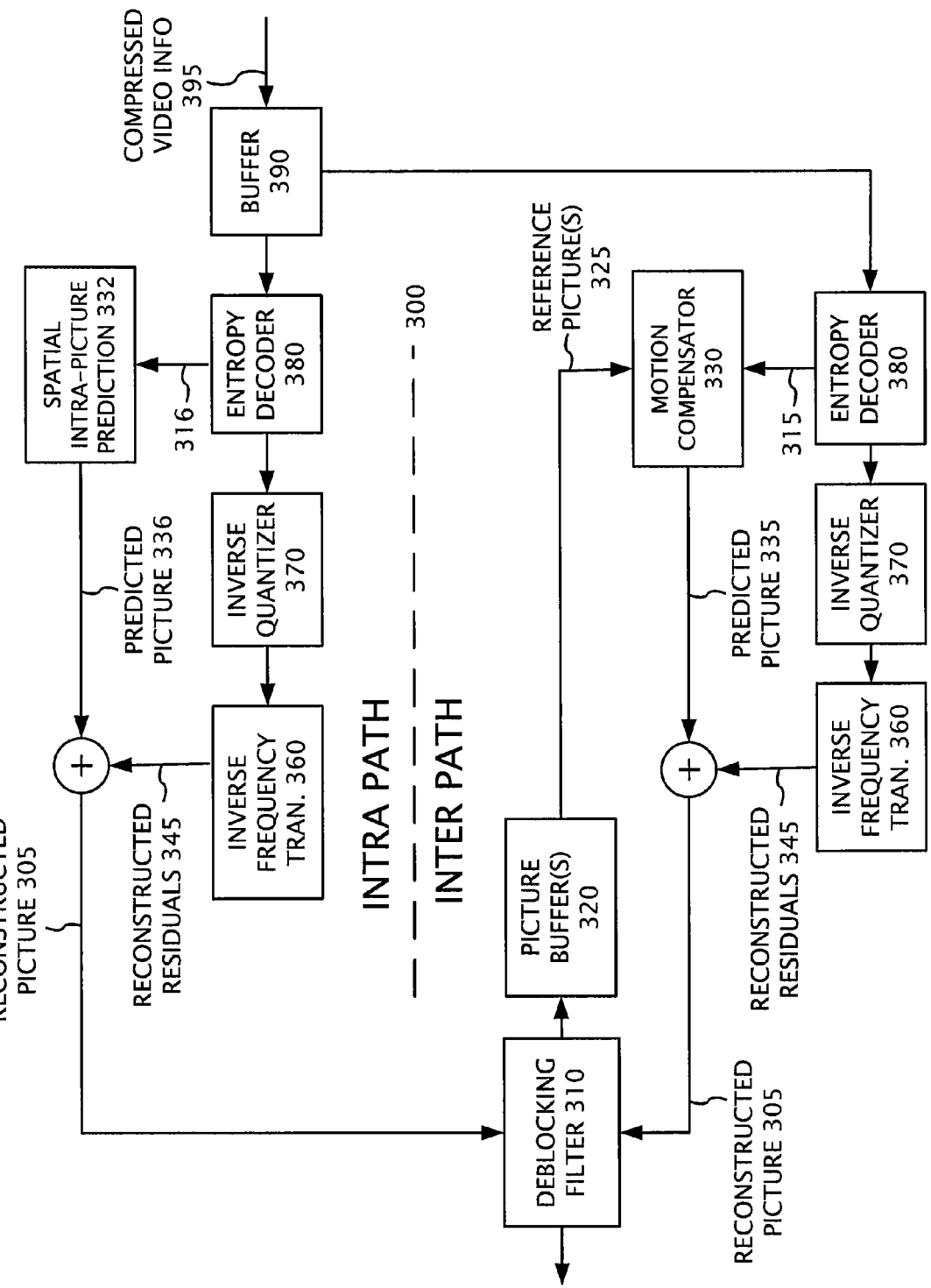
FIG. 3 is a block diagram of an exemplary embodiment of a video decoder in conjunction with which at least some of the described embodiments can be implemented.

FIG. 3 is a block diagram of a generalized video decoder 300 in conjunction with which at least some of the described embodiments can be implemented. The relationships shown between modules within the decoder 300 indicate general flows of information in the decoder; other relationships are not shown for the sake of simplicity. In particular, while a decoder host performs some operations of modules of the decoder 300, in particular implementations a video accelerator performs other operations (such as inverse frequency transforms, fractional sample interpolation, motion compensation, in-loop deblocking filtering, color conversion, post-processing filtering and/or picture re-sizing). Different versions of a given video accelerator can perform different levels of decoding, as well.

The decoder 300 processes video pictures, which can be video frames, video fields or combinations of frames and fields. The bit stream syntax and semantics at the picture and macroblock levels can depend on whether frames or fields are used. The decoder 300 is block-based and uses a 4:2:0 macroblock format for frames. For fields, the same or a different macroblock organization and format can be used. 8×8 blocks can be further sub-divided at different stages. Alternatively, the decoder 300 uses a different macroblock or block format, or performs operations on sets of samples of different size or configuration.

The decoder 300 receives information 395 for a compressed sequence of video pictures and produces output including a reconstructed picture 305 (e.g., progressive video frame, interlaced video frame, or field of an interlaced video frame). The decoder system 300 decompresses predicted pictures and key pictures. For the sake of presentation, FIG. 3 shows a path for key pictures through the decoder system 300 ("intra path") and a path for predicted pictures ("inter path"). Many of the components of the decoder system 300 are used for decompressing both key pictures and predicted pictures. The exact operations performed by those components can vary depending on the type of information being decompressed. Moreover, intra-coded parts of a predicted picture may be decoded following the intra path.

A buffer/demultiplexer 390 receives the information 395 for the compressed video sequence and makes the received information available to the entropy decoder 380. The entropy decoder 380 entropy decodes entropy-coded quantized data as well as entropy-coded side information (such as motion information 315, spatial prediction mode information 316), typically applying the inverse of entropy encoding performed in the encoder. A motion compensator 330 applies motion information 315 to one or more reference pictures 325 to form motion-compensated predictions 335 of sub-blocks, blocks and/or macroblocks of the picture 305 being reconstructed. One or more picture buffers 320 store previously reconstructed pictures for use as reference pictures and may also store other reconstructed, non-reference pictures before output.

In some implementations, for the intra path, a spatial intra-picture prediction module 332 extrapolates from previously reconstructed sample values in a current picture to predict the sample values of a current part in the same picture. The spatial prediction mode information 316 indicates how to perform the spatial prediction for the respective parts of the current picture.

The decoder 300 also reconstructs prediction residuals, which can be motion-compensated prediction residuals or spatial prediction residuals. An inverse quantizer 370 inverse quantizes entropy-decoded data. An inverse frequency transformer 360 converts the quantized, frequency domain data into spatial domain video information. For example, the inverse frequency transformer 360 applies an inverse block transform to sub-blocks and/or blocks of the frequency transform coefficients, producing sample data or prediction residual data, depending on the type of compression used. The inverse frequency transformer 360 can apply an 8×8, 8×4, 4×8, 4×4, or other size inverse frequency transform.

For a predicted picture, the decoder 300 combines reconstructed prediction residuals 345 with motion compensated predictions 335 to form the reconstructed picture 305. For a picture coded using spatial intra prediction, the decoder 300 combines reconstructed prediction residuals 345 with spatial predictions 336 to form the reconstructed picture 305. A motion compensation loop in the video decoder 300 includes an adaptive deblocking filter 310. The decoder 300 applies in-loop filtering 310 to the reconstructed picture to adaptively smooth discontinuities across block/sub-block boundary rows and/or columns in the picture. In some cases, the decoder stores the reconstructed picture in a picture buffer 320 for use as a possible reference picture.

Generally, some functions of error detection, error concealment and error recovery (including recovery from errors that occur upon a channel start or file seek operation) are distributed among the modules of the decoder 300 shown in FIG. 3. For example, the demultiplexer 390 or other module, while performing operations as part of picture extent discovery can scan encoded data in decoder buffers for bit-flip errors, checksum errors or missing network abstraction layer units. The entropy decoder 380 can detect errors (e.g., caused by bit-flips) during entropy decoding. The motion compensator 330 or other module can adjust pictures buffered in the picture buffer(s) 320 as part of error concealment or recovery upon a channel start or file seek operation, and detect when reference pictures are missing for parts of a current predicted picture. A controller (not shown) or other module in a decoder host can coordinate operations the demultiplexer 390, entropy decoder 380, motion compensator 330 and other modules as part of error detection, error recovery and error concealment.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of video decoders typically use a variation or supplemented version of the generalized decoder 300.

Example Playback Systems

Figure 4:
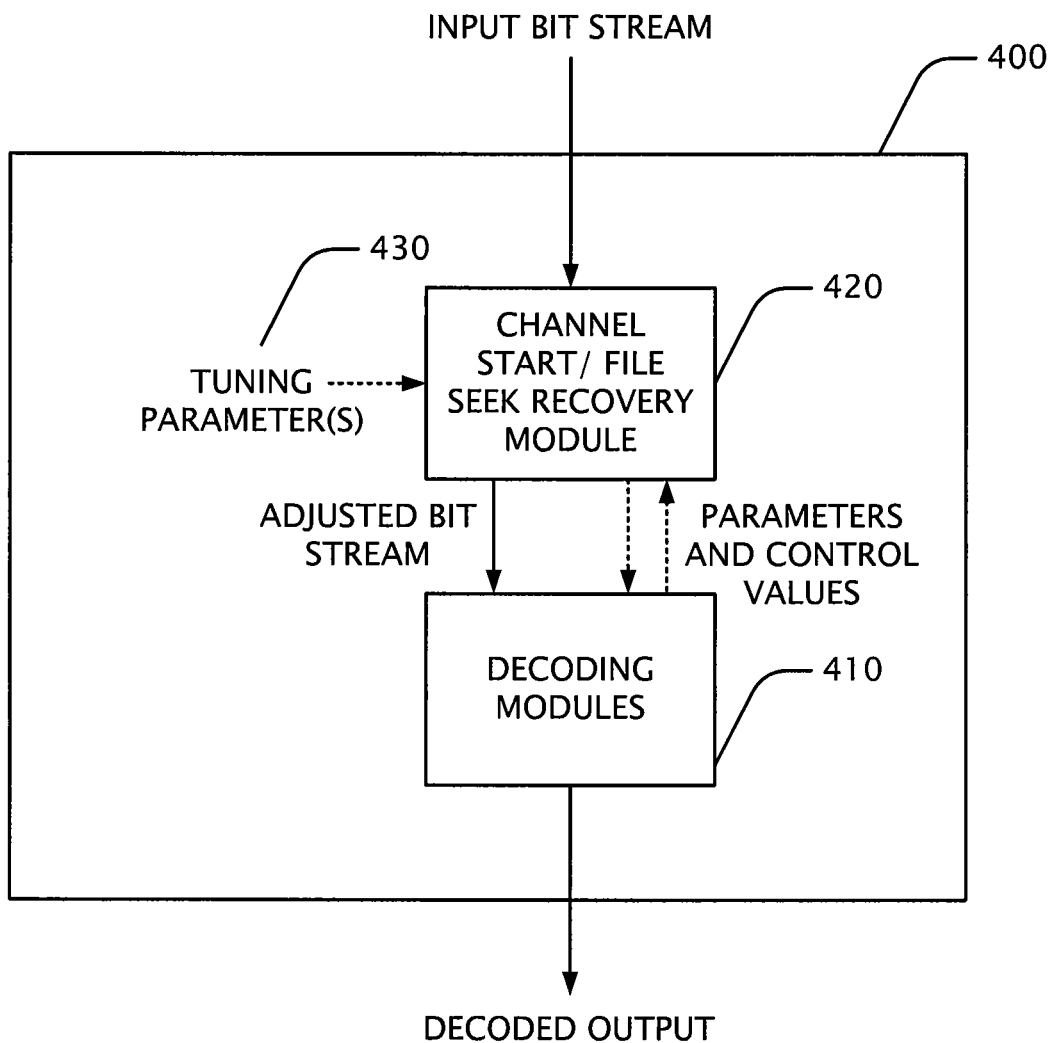
FIG. 4 shows a block diagram of an exemplary embodiment of a video playback system in conjunction with which at least some of the described embodiments can be implemented.

FIG. 4 shows a block diagram of an exemplary embodiment of a video playback system 400. The system 400 comprises, for example, decoder modules 410 (such as those described above with reference to example video decoder 300) and a channel start/file seek recovery module 420. The recovery module 420 can identify a point in an encoded input bit stream to begin decoding the bit stream upon a channel start or file seek operation. In some embodiments, the recovery module 420 identifies this point based at least in part on one or more tuning parameters 430. Examples of the tuning parameters 430 are described in more detail below.

The recovery module 420 adjusts the input bit stream that is input to the decoder modules 410. For example, the recovery module 420 discards encoded data for pictures that are not decoded. As another example, in some cases, the recovery module 420 modifies syntax elements of the input bit stream (e.g., a frame number value) to cause the decoding modules 410 to change decoding in some way (e.g., to re-initialize reference picture buffers) to recover upon a channel start or file seek operation. Aside from adjustments to the input bit stream, in some cases, the recovery module 420 more directly interacts with the decoding modules 410 by setting parameter values (e.g., picture count values, or a frame number value) used during decoding to recover upon a channel start or file seek operation, or by reacting to decoding errors reported by the decoding modules 410 (e.g., to cause the system 400 to skip display of corrupted pictures).

Components of the system 400 can be implemented in one or more electronic devices including, for example, computer-readable storage media and a hardware device (e.g., a digital video receiver, a set-top box, a mobile computing device and/or a general purpose computer) configured to perform one or more methods described herein.

Example Uses of Tuning Parameters

Figure 5:
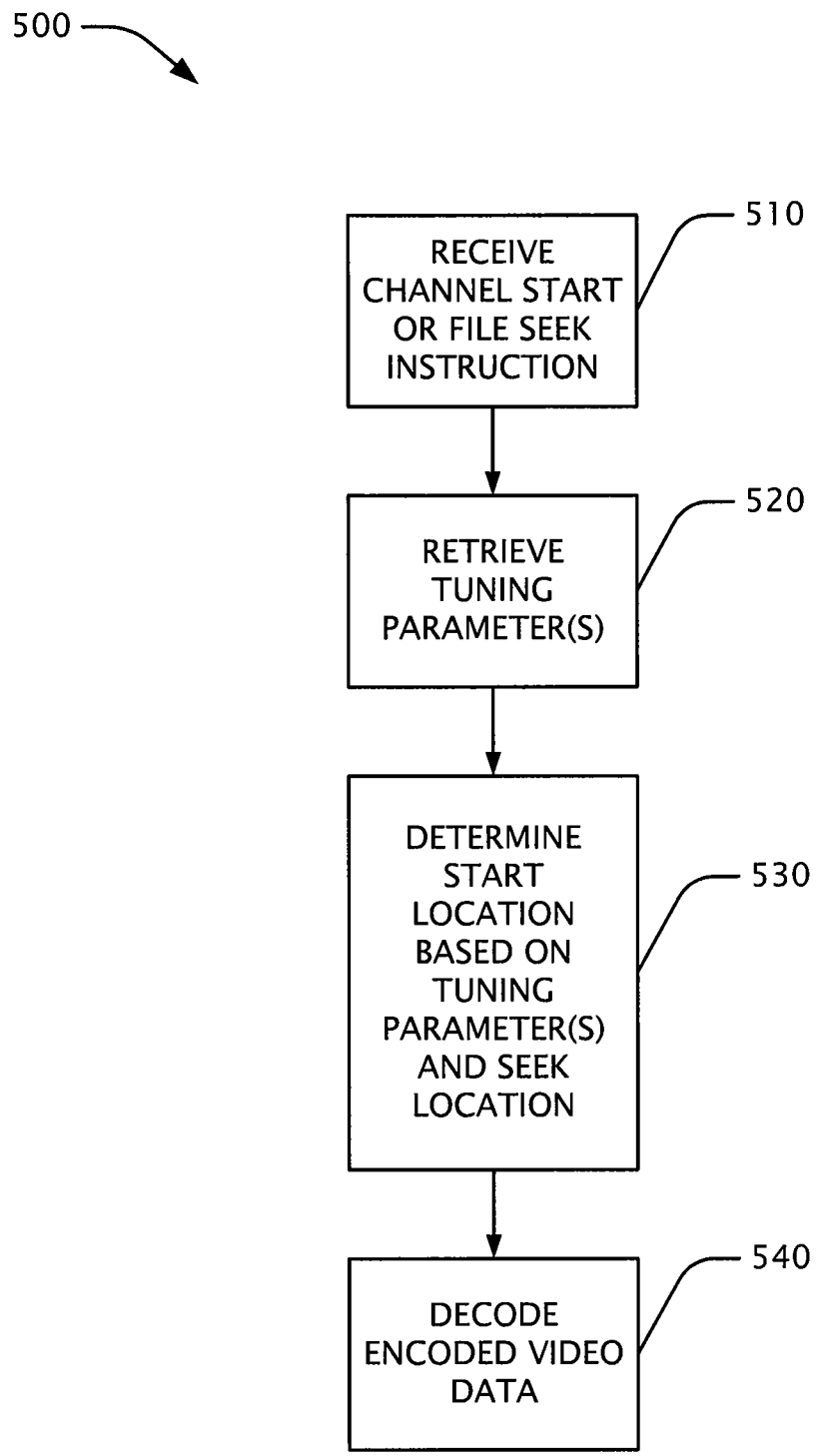
FIG. 5 shows an exemplary embodiment of a method for using one or more tuning parameters to regulate decoding of video data upon a channel start or file seek.

FIG. 5 shows an exemplary embodiment of a method 500 for using one or more tuning parameters to regulate decoding of video data upon a channel start or file seek in a system such as the system 400. The video data comprise at least some inter-coded pictures and at least some strictly intra-coded pictures. In a method act 510, an instruction to perform a channel start or file seek operation on a video bit stream containing the video data is received. In one or more embodiments disclosed herein, the instruction can be an indication of a seek location for the encoded video data (e.g., a desired point at which the system 400 is to begin display of the video). The seek location can be, for example, a time stamp for a picture of the bit stream, a first available location in the bit stream, and/or another identifier of a position of the bit stream. In some cases, the seek location indicates a picture in the bit stream that comprises inter-coded content. A picture that lacks inter-coded content (e.g., an I picture or an IDR picture, which is a special kind of I picture in the H.264/AVC compression scheme that indicates no later picture in the bit stream has motion compensation dependencies before the IDR picture in the bit stream) will not necessarily be immediately available when the instruction is received.

In a method act 520, the one or more tuning parameters 430 are retrieved. The parameters 430 can be retrieved from, for example, one or more computer-readable storage media accessible to the system 400, locally (e.g., in RAM, on a hard drive) and/or remotely (e.g., over a computer network). In some embodiments, the parameters 430 are provided by and/or determined at least in part by user input. In general, the one or more parameters 430 are selected to set a preference between latency in starting to display decoded pictures (e.g., on a display screen) from the video stream and possible defects in the displayed pictures. The defects can be caused at least in part by, for example, failure in decoding inter-coded content that refers to one or more unavailable pictures from earlier in the bit stream. Different values of the tuning parameter(s) provide different ways to tradeoff potential latency versus potential corruption in display of the video upon a channel start or file seek operation.

In some embodiments, the one or more parameters 430 comprise a key picture count parameter. The key picture count parameter indicates a number of pictures in the bit stream to be (potentially) searched to find a picture that lacks inter-coded content. For example, the system 400 searches the bit stream picture-by-picture after the seek location, for up to the number of pictures indicated by the key picture count parameter, stopping if the system 400 finds a intra-coded picture from which to start decoding. The number of pictures indicated by the key picture count parameter can be a limited number or an unlimited number. The value of the key picture count parameter depends on implementation. In some implementations, the key picture count parameter has a maximum allowable value (e.g., INT_MAX). In other implementations, the key picture count parameter has a value corresponding to s seconds of video, where s is 6 seconds, for example.

In further embodiments, the one or more tuning parameters 430 comprise a display skip parameter. The display skip parameter indicates a number of pictures to be decoded but not displayed. For example, after an I picture or P picture at which the system 400 starts decoding, the system 400 skips display of the number of pictures indicated by the display skip parameter. The pictures are not displayed because one or more of the decoded pictures may contain one or more defects. The defects can include, for example, inter-coded content with references to missing or otherwise unavailable reference pictures from earlier in the video stream.

Alternatively, the system selectively skips display of pictures up to the number indicated by the display skip parameter, displaying non-corrupt pictures but skipping display of corrupt pictures. For example, after an I picture or P picture at which the system 400 starts decoding, the system 400 checks each decoded picture for defects, up to number of pictures indicated by the display skip parameter. A decoded picture is not displayed if the decoded picture contains one or more defects, or at least one or more defects significant enough to be perceptible.

The number of pictures indicated by the display skip parameter can be a limited number or an unlimited number. The value of the display skip parameter depends on implementation. In some implementations, the display skip parameter has a maximum allowable value (e.g., INT_MAX). In other implementations, the display skip parameter has a value corresponding to s seconds of video, where s is about 0.5 seconds, for example.

In a method act 530, a start location in the bit stream for displaying pictures decoded from the bit stream is determined. This determination can be made based at least in part on the one or more tuning parameters 430 and the seek location. The start location can be the same as the seek location (e.g., if the seek location indicates an I picture that is an IDR picture), or it can be later in the bit stream (e.g., if the first IDR picture is after the seek location). In particular embodiments, as a result of determining that at least one of the decoded pictures contains one or more defects, at least one of the decoded pictures with one or more defects is stored in a reference buffer without displaying that decoded picture. Accordingly, the start location can be located at a point in the bit stream after the pictures that are decoded, but not displayed.

In a method act 540, the system 400 decodes at least part of the encoded video data from the bit stream to support display of the decoded pictures beginning from the start location. In some cases this includes decoding pictures that are before the start location.

Example Uses of Identifier Value to Trigger Reference Picture Operations

Figure 6:
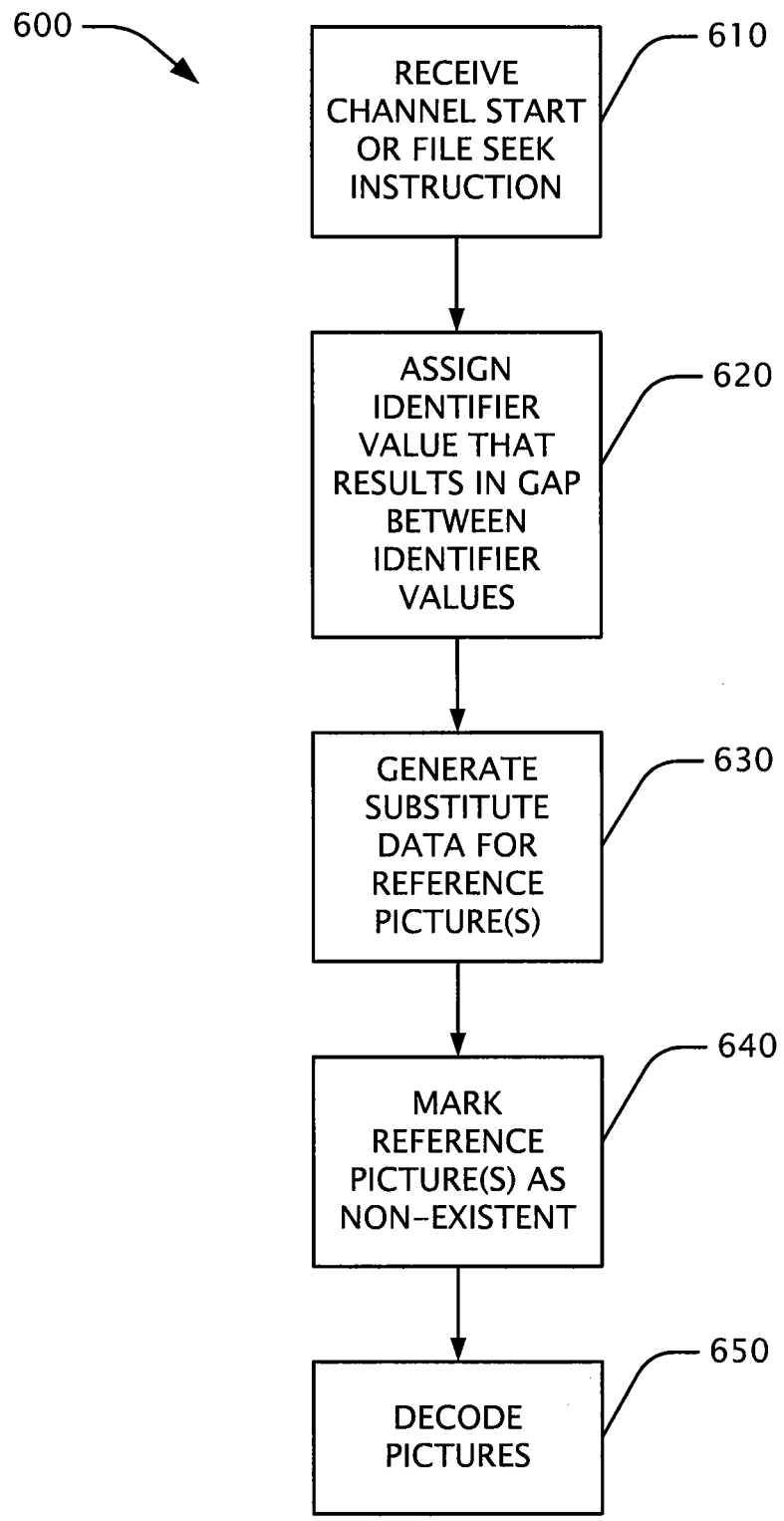
FIG. 6 shows an exemplary embodiment of a method for using a substitute identifier value to regulate decoding of video data upon a channel start or file seek.

FIG. 6 shows an exemplary embodiment of a method 600 for using a substitute identifier value to regulate decoding of video data upon a channel start or file seek in a system such as the playback system 400. In a method act 610, an instruction to perform a channel start or file seek for a bit stream of encoded data is received by the system 400. Examples of different channel start instructions and file seek instructions are described with reference to FIG. 5.

In response to the instruction, in a method act 620, an identifier value is assigned. For example, the playback system 400 assigns the identifier value by replacing a syntax element for the identifier value in the bit stream with a substitute syntax element that indicates the substitute identifier value. The substitute syntax element can be assigned, for example, to a dummy frame fed to the decoder or to a picture before the first picture to be decoded for the channel start or file seek. Or, the assigned identifier value can be fed to the decoder in some other way. In any case, the assigned identifier value creates a gap between identifier values. In some implementations, the assigned identifier value is selected to be outside of a range of valid identifier values for the decoded pictures, such that a gap is always created.

As a result of assigning the identifier value to create the gap in identifier values, at a method act 630, substitute data (e.g., sample values) are generated for one or more reference pictures. The reference pictures in question include, for example, placeholder pictures in place of reference pictures actually referred to by inter-coded content of the decoded pictures after the channel start or file seek. More generally, the reference pictures in question include pictures not guaranteed to be available for use as reference pictures because of the channel start or file seek operation.

As a further result of assigning the identifier value to create the gap in identifier values, in a method act 640, one or more reference pictures are marked as being non-existent or otherwise unavailable for purposes of motion compensation or reference picture management. In particular, the one or more reference pictures for which substitute data are generated are marked to make them unavailable for motion compensation or reference picture management. More generally, as a precursor to actual decoding after the channel start or file seek operation, reference pictures at possible frame number values are invalided for purposes of motion compensation and reference picture management.

In a method act 650, pictures are decoded for playback upon the channel start or file seek operation. As decoding proceeds after the channel start or file seek operation, the system 400 eventually populates the decoded picture buffer with valid reference frames. Until then, due to the processing triggered in reaction to the gap in identifier values, motion vectors that refer to "non-existing" reference pictures (or reference pictures otherwise marked as unavailable) are characterized as "missing references."

For example, in some cases (such as when the first picture is not an IDR picture), the first picture after the channel start or file seek, or a picture after the first picture in the bit stream, can include a block or macroblock that uses motion-compensated prediction relative to a reference picture before the first picture in the bit stream. The reference picture might actually have been available (e.g., if the file seek is for a short fast forward or short fast reverse operation) but is not guaranteed to be available and, in any case, is not available after the processing triggered by the gap in identifier values. The first picture (or later picture with a block, macroblock, etc., that is motion-compensated relative to a picture before the first picture in the bit stream) is therefore treated as "missing reference"/corrupted.

Example Uses of Display Order Data

Figure 7:
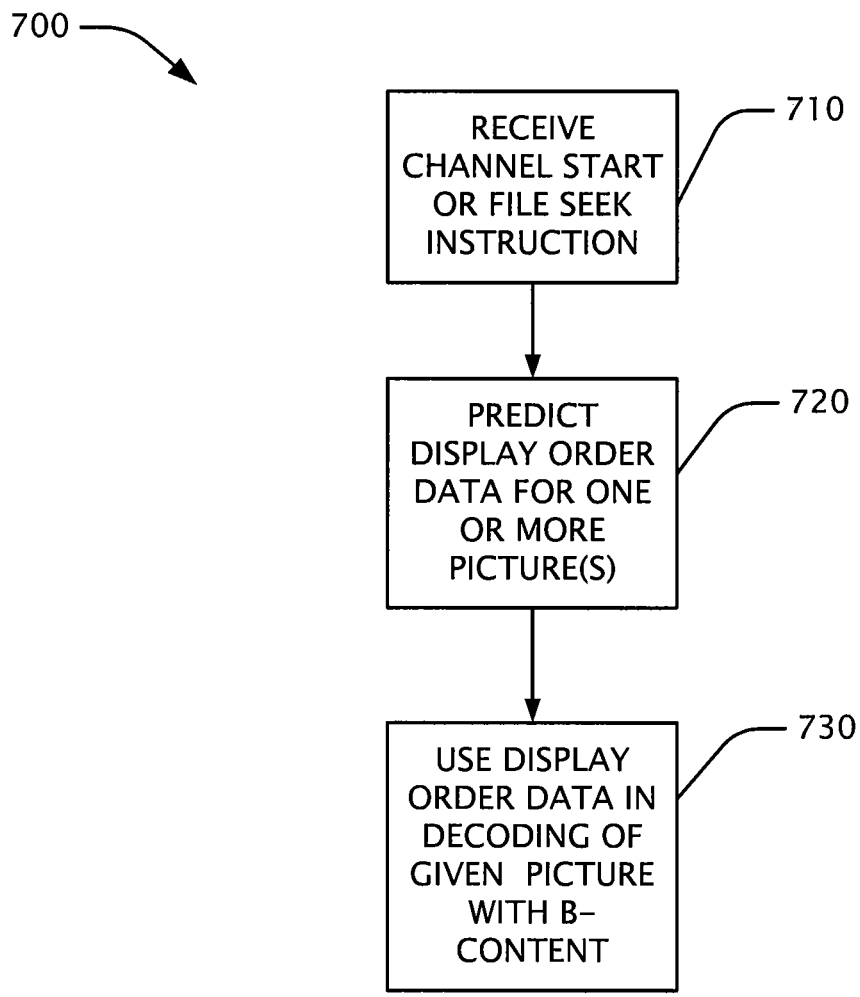
FIG. 7 shows an exemplary embodiment of a method for using generated display order data in decoding of video data upon a channel start or file seek.

FIG. 7 shows an exemplary embodiment of a method 700 for decoding encoded data using display order data. The method 700 can be used with, for example, the system 400. At a method act 710, an instruction to perform a channel start or file seek for a bit stream of encoded data is received by the system 400. Examples of different channel start instructions and file seek instructions are described with reference to FIG. 5.

In a method act 720, as part of decoding in response to the channel start or file seek instruction, display order data is predicted for one or more pictures. In some embodiments, predicting the display order data comprises determining a display order count for a first decodable picture after a channel start or file seek and then, for each of one or more preceding pictures, in turn subtracting a value from the display order count as a running counter. More generally, predicting the display order data comprises performing a backward prediction from a display order count assigned to the first decoded picture after a channel start or file seek to determine display order counts for unavailable pictures stored in the decoded picture buffer that precede the first decoded picture in display order.

The decoding also includes, in a method act 750, using the predicted display order data during the decoding of a picture that comprises inter-coded content encoded with bi-directional motion compensation. For example, in some implementations (e.g., implementations of a H.264 decoder), decoding of content encoded with bi-directional motion compensation (e.g., for macroblocks of a B slice) uses display order data that the decoder generates in a deterministic way during decoding. The decoder initializes the display order data when it reaches an IDR picture, and it thereafter assigns display order counts based upon signaled syntax elements and defined rules. Upon a channel start or file seek, the decoder may begin decoding at a non-IDR picture, however, and lack the contextual display order data it would normally have. Therefore, the decoder uses the predicted display order data in decoding upon a channel start or file seek.

Selected Details of H.264 Standard

In some implementations, one or more of the described techniques is used when decoding an H.264-conformant bit stream. To provide background details for these example implementations, this section presents some details of the H.264 standard. The H.264 standard is now formally called the ISO/IEC 14496-10 standard, and was formerly known as the AVC standard or H.26L standard. Section citations refer to the fourth edition of the 14496-10 standard, dated Sep. 15, 2008.

According to the H.264 standard, a picture includes one or more slices of macroblocks, where a slice is a set of macroblocks. A slice can be an I slice, P slice or B slice, among other types of slices. An I slice is decoded using intra prediction only. A P slice may be decoded using intra prediction or inter prediction, where the inter prediction uses at most one motion vector and reference picture index to predict the sample values of each block. A B slice may be decoded using intra prediction or inter prediction that uses at most two motion vectors and reference picture indices to predict the sample values of each block.

Although the syntax of the H.264 standard does not use picture types per se, by convention a picture that includes only I slice(s) is called an I picture. A picture that includes P slice(s) and, possibly, I slice(s) is called a P picture. A B picture includes one or more B slices but can include other types of slices as well. In some cases, an I picture is constrained to have only I slices, a P picture is constrained to have only P slices, or a B picture is constrained to have only B slices.

The H.264 standard describes special-purpose bit stream syntax elements and detailed rules for managing a decoded picture buffer. The buffer stores one or more previously decoded reference pictures that may be used in motion compensation of other pictures. The decoded picture buffer can also store other pictures, for example, a non-reference picture that has been decoded but whose display time has not yet occurred.

A reference picture list, which lists reference pictures stored in the decoded picture buffer, is used for inter prediction of a P slice or B slice. For decoding a P slice, there is one reference picture list, and for decoding a B slice, there are two reference picture lists. The ordering of reference pictures in a list affects the efficiency with which different reference pictures are identified using reference picture indices. Ideally, for example, more commonly used reference pictures are earlier in a list and their lower reference picture indices are entropy coded more efficiently, while less commonly used reference pictures are later in the list and identified with higher indices. The H.264 standard specifies rules for constructing reference picture lists as well rules for updating the decoded picture buffer to remove old reference pictures and put in new reference pictures.

Basically, the construction of a reference list for a given P slice or B slice includes initialization operations and, in some cases, reordering operations. In practice, most H.264-conformant bit streams use only initialization when constructing reference picture lists—the reordering operations are optional and rarely used. A reference list can include one or more pictures used for "short-term" reference and one or more pictures used for "long-term" reference. How a reference picture is ordered relative to other pictures in the list changes depending on whether the reference picture is used for short-term reference or used for long-term reference. Typically, short-term reference pictures are given lower reference picture indices.

For short-term reference pictures, initialization in a reference picture list for a P slice of a field or frame is based on frame numbers for the reference pictures. The frame numbers are assigned during decoding according to frame_num syntax elements signaled in the bit stream (in slice headers for the respective reference pictures). For long-term reference pictures, the initialization of the list for a P slice is based on LongTermFrameIdx values assigned to the long-term reference pictures, which are also generally based on parameters signaled in the bit stream. Reordering of short-term reference pictures is based on frame number values, and reordering of long-term reference pictures is based on LongTermFrameIdx values.

For a B slice of a field or frame, for short-term reference pictures, initialization of a reference picture list is based on "picture order counts" of the reference pictures. Picture order counts, as described in more detail below, are determined according to detailed derivation rules and, in some cases, are based on syntax elements signaled in the bit stream. For long-term reference pictures, initialization of the list for a B slice is based on LongTermFrameIdx values. Reordering generally follows the same rules as for P slices.

Section 7.4.3 of the H.264 standard provides detailed rules for assigning frame number values to pictures based on the frame_num syntax element, and it describes constraints on valid frame_num values in a bit stream. (As explained above, frame numbers for frames that have been decoded are used when ordering reference pictures in reference picture lists.) During decoding, when a decoder encounters an unexpected gap in frame number values (e.g., frame_num values in two consecutive pictures in decoding order are not contiguous), the decoder attempts to recover by performing certain operations on reference pictures. As described in section 8.2.5.2, these operations include generating one or more frames that correspond to frame(s) in the gap. The generated frame(s) have sample values set to any value and are marked "non-existing" and "used for short-term reference." Some of the generated frames may be stored in the decoded picture buffer, but reference to the generated frames for inter-prediction or reference picture reordering is not allowed.

A picture order count is a variable having a value that is non-decreasing with increasing picture position in output order. A picture order count is numbered relative to the previous IDR picture in decoding order or relative to a special previous picture that marks all reference pictures as "unused for reference." As explained above, picture order counts are used to determine initial picture orderings for reference pictures in the decoding of B slices. They are also used for other purposes such as derivation of motion vectors for some direct mode macroblocks of B slices. Section 8.2.1 provides detailed rules for how picture order counts are determined during decoding.

See the corresponding parts of the H.264 standard for full details about reference picture construction (e.g., sections 7.4.3.1, 7.4.3.3, and 8.2.4), frame_num gap processing (e.g., 8.2.5.2), picture order count derivation (e.g., section 8.2.1) and decoded picture buffer management (e.g., Annex C). These sections and other sections of the H.264 standard specify how to decode a H.264-conformant bit stream received without missing pictures or other errors. In particular, most sections assume that decoding begins from an IDR picture, at which point assignment of frame numbers (based on frame_num syntax elements) and picture order counts is initialized. On a channel start or file seek, however, the decoder may need to begin decoding with a non-IDR picture, which could be a non-IDR I picture or P picture. When decoding begins from a non-IDR I picture or P picture (if an I picture is not found), macroblocking or other corruptions may result. Generally, the techniques described herein help reduce latency before decoding starts after a channel start or file seek, while also reducing macroblocking and other forms of corruption.

Figure 8:
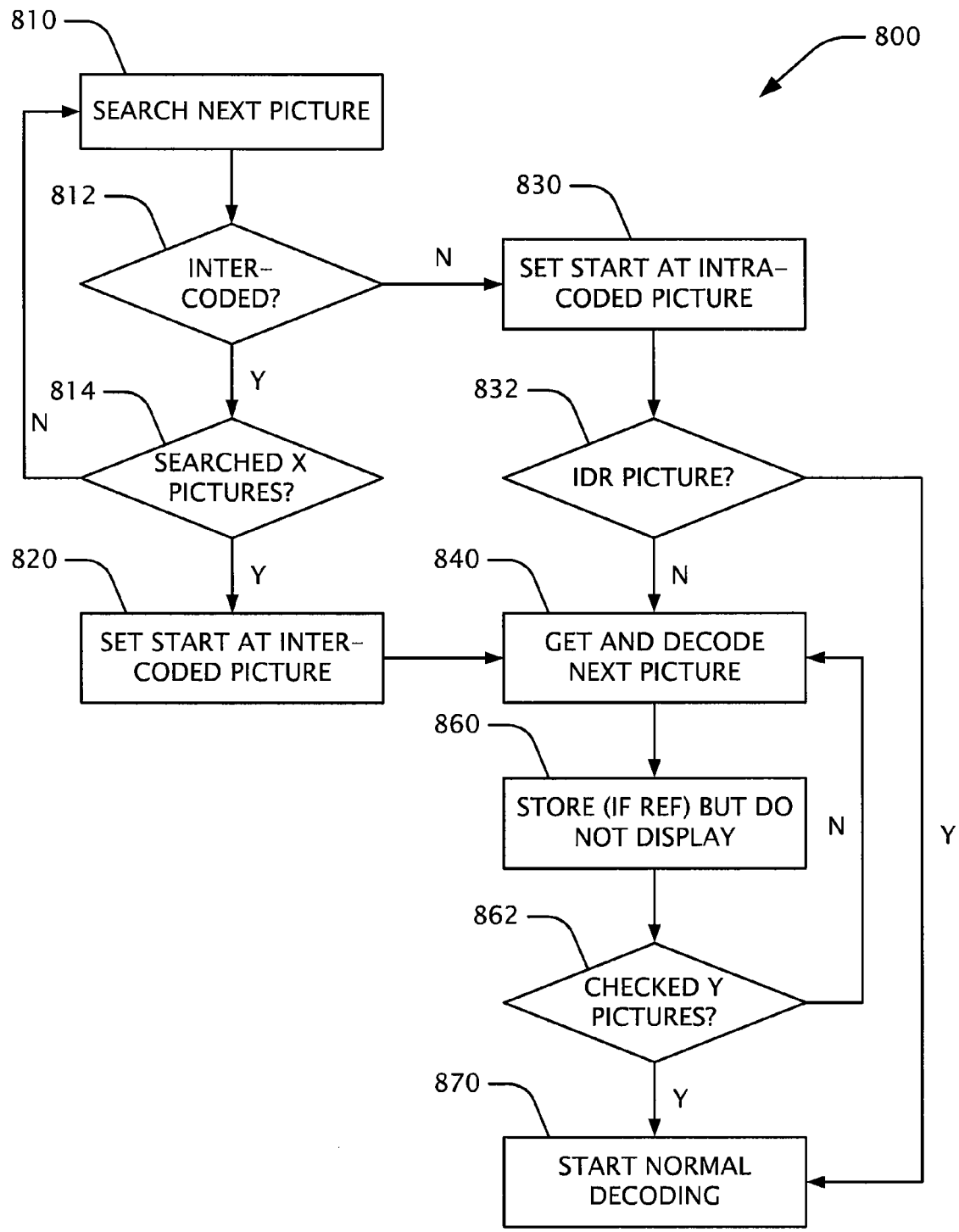
FIG. 8 shows an exemplary embodiment of a method for using a key picture count parameter and display skip count parameter to regulate decoding of video data upon a channel start or file seek.
Figure 9:
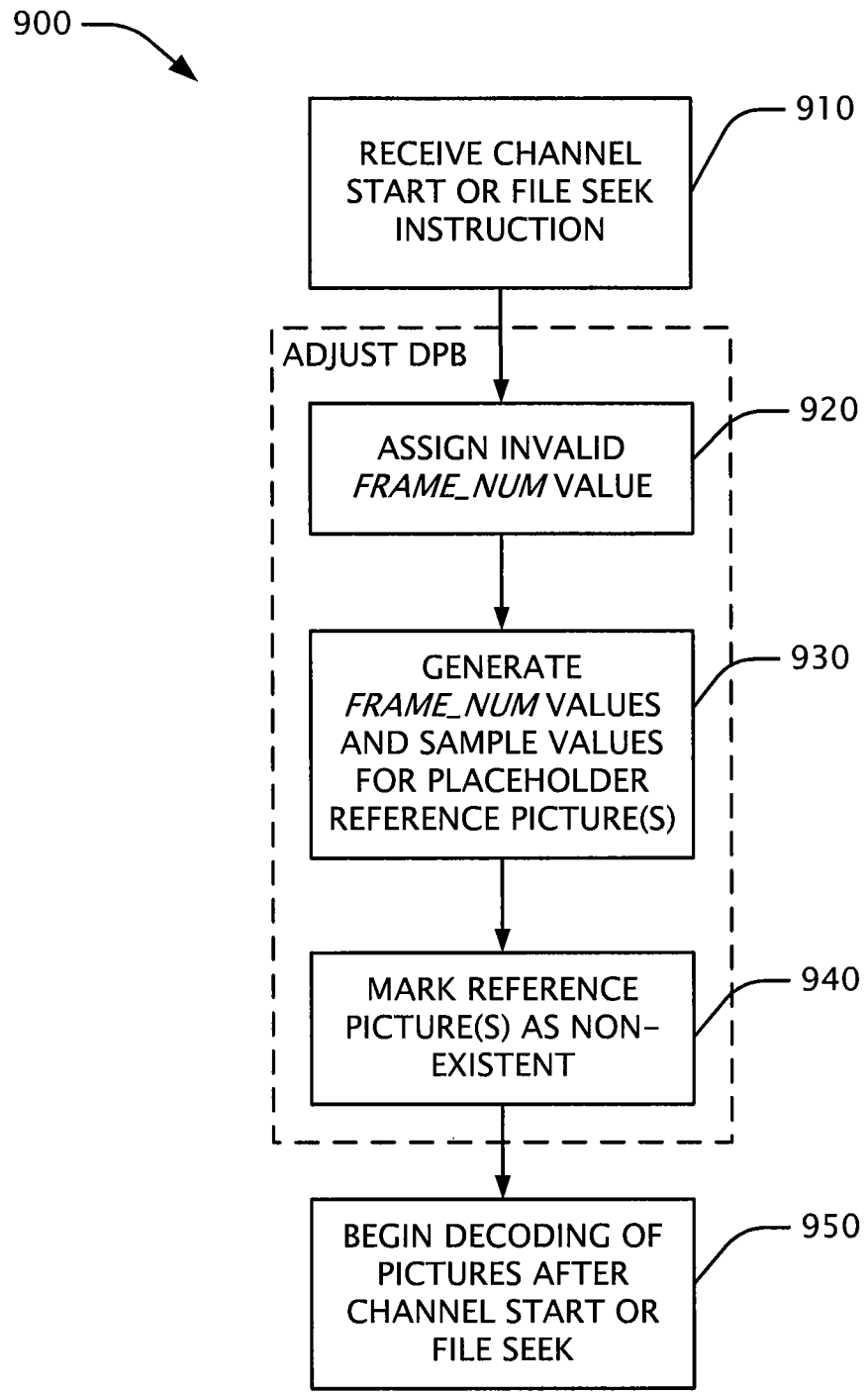
FIG. 9 shows an exemplary embodiment of a method for using a substitute frame number value to regulate decoding of video data upon a channel start or file seek.
Figure 10:
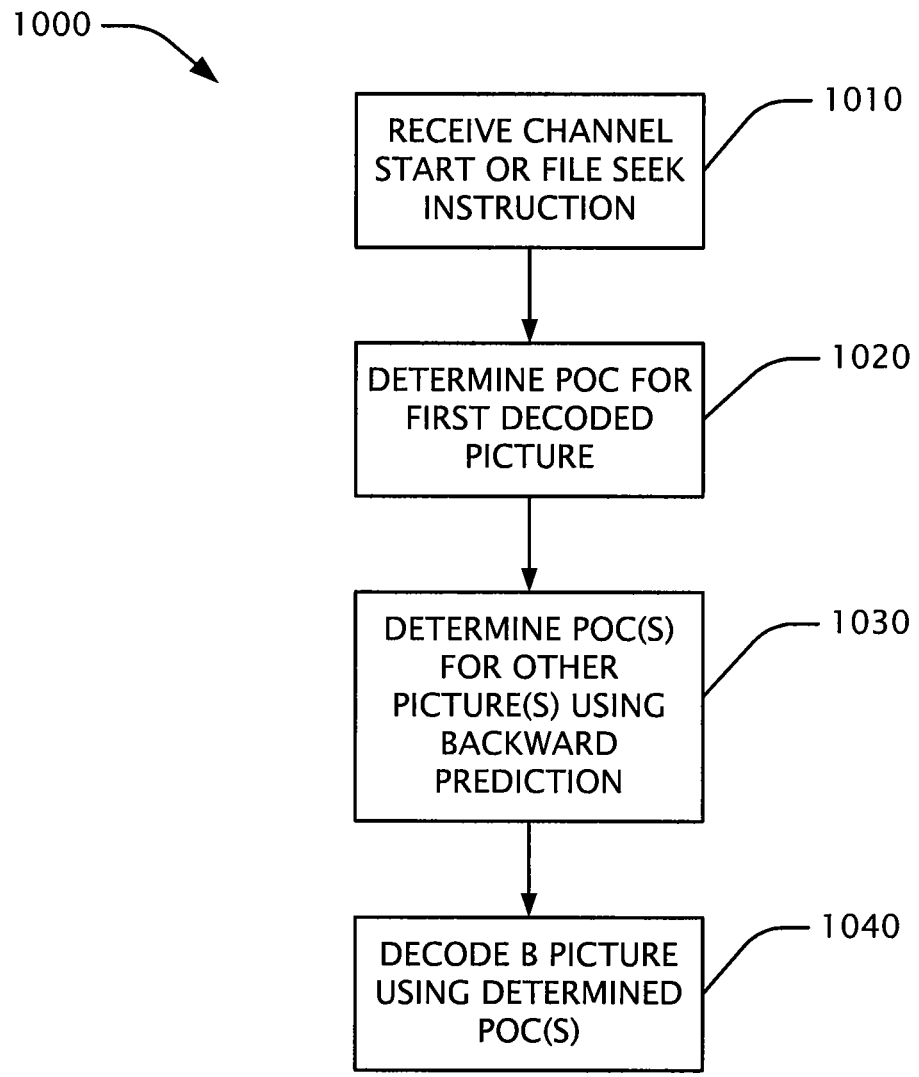
FIG. 10 shows an exemplary embodiment of a method for using predicted picture order counts in decoding of video data upon a channel start or file seek.

FIGS. 8 through 10 show further exemplary embodiments of the disclosed technologies for H.264 decoder implementations. Although at least some aspects of the embodiments appearing in FIGS. 8 through 10 are described with respect to features of the H.264 standard, at least some aspects can be applied to other video coding standards as well.

Examples Uses of Multiple Tuning Parameters

FIG. 8 shows an example method 800 for using a key picture count parameter X and display skip count parameter Y to regulate decoding of video data upon a channel start or file seek. The two count parameters, used together, provide a two-stage process for determining when to start decoding. In the first stage (regulated by the key picture count parameter X), the decoder searches for an intra-coded picture to begin decoding. In the second stage (regulated by the display skip count parameter Y), the decoder skips display of some or all decoded pictures. Together, these count parameters allow control over a tradeoff between potential latency (indicated by X+Y) and potential corruption.

A system such as the system 400 performs the method 800. In a method act 810, in response to receiving an instruction to perform a channel start or file seek for the bit stream, the next picture in the bit stream (e.g., after the seek location indicating a desired place to begin searching) is searched. The system then checks (812) whether the searched next picture includes inter-coded content. If not, the system has identified an intra-coded picture at which to begin decoding. Otherwise, the system checks (814) whether it has searched more than the number X of pictures indicated by the key picture count parameter. If the system has not already searched X pictures, the system continues by searching 810 the next picture in the bit stream. Otherwise, if the system has searched X pictures without finding an intra-coded picture, at method act 820, the system sets the start of decoding to an inter-coded picture.

Thus, a key picture count parameter X number of pictures in the bit stream are potentially searched for a picture that does not comprise inter-coded content (e.g., an instantaneous data refresh (IDR) picture or other I picture). If the key picture count parameter is set to INT_MAX, which is unlimited for practical purpose, or otherwise unlimited, the searching continues until an intra-coded picture is found.

If a picture that does not comprise inter-coded content is identified within X pictures, then the system 400 proceeds, at a method act 830, to set the start of decoding beginning with the identified picture that does not comprise inter-coded content. First, however, in a method act 832, the system checks whether the identified picture is an IDR picture. If the identified picture is an IDR picture, in act 870, the system begins normal decoding from the IDR picture. If the identified picture is not an IDR picture, the system proceeds to second stage of recovery decoding after the channel start or file seek operation.

When decoding begins from an inter-coded picture (e.g., P picture or B picture) or non-IDR I picture, at method act 840, the system gets and decodes the picture. In some cases, the picture comprising inter-coded content refers to one or more unavailable reference pictures. The reference pictures can be unavailable because, for example: the unavailable pictures became lost or corrupted in transmission, the unavailable pictures were available in the bit stream only before the channel start or file seek instruction was executed, and/or for one or more other reasons. Although an I picture itself will not be missing references to other pictures, one or more pictures that follow the I picture in decoding order may be missing references. This can be caused by, for example, encoded pictures that contain references to other pictures that are unavailable, by an open GOP for which B pictures precede the I picture in output order but follow it in decoding order, and/or for one or more other reasons.

Thus, when decoding begins with a picture comprising inter-coded content or a non-IDR I picture, it is possible that one or more decoded pictures will not be correctly decoded (e.g., there can be macroblocking or other corruptions in the decoded pictures). Generally, the chance of such errors occurring decreases as the number of previously decoded pictures increases after the channel start/file seek and as these decoded pictures become available for reference. This is due, for example, to intra-coded content refresh techniques conventionally used for video bit streams to avoid or prohibit long-term error propagations. Accordingly, in some embodiments, in a method act 860, the system stores the decoded picture as a reference picture (if the picture is so designated) but skips the display of the picture. At act 862, the system checks whether it has performed this display skipping for the number of pictures Y indicated by the display skip parameter. If not, the system continues by getting and decoding 840 the next picture in the bit stream. Otherwise, if the system has skipped display of Y pictures, at method act 870, the system begins normal decoding, at which point corrupt pictures, however unlikely, might be displayed.

Alternatively, the system selectively displays non-corrupt pictures even before Y pictures have been decoded. For example, the system checks whether the decoded picture is corrupt. If the decoded picture is corrupt, the system stores the decoded picture as a reference picture (if the picture is so designated) but skips the display of the picture. If the decoded picture is not corrupt, the system stores the decoded picture as a reference picture (if the picture is so designated) and displays the picture. Again, the system performs this display skip processing for Y pictures.

Thus, a display skip parameter indicates a number Y of pictures that are decoded and buffered. However, some or all of the Y number of decoded pictures might not be displayed. Generally, the size of the value Y affects the quality of the displayed video if there are missing references or stream corruptions in the decoded pictures. If the display skip parameter is set to INT_MAX, which is unlimited for practical purpose, or otherwise unlimited, the checking continues indefinitely (e.g., until an IDR picture or the end of the sequence), and some pictures should be selectively displayed. On the other hand, if the display skip parameter is set to a small value (e.g., 16 fields/8 frames, for about a quarter second of video), the number of pictures for which display is skipped will be correspondingly small. Automatically skipping display for all Y pictures makes smooth video playback more likely when display starts, as opposed to the slight choppiness that may otherwise be exhibited if display is selectively skipped.

Selecting values for X and Y can allow for balancing the potential for latency against the potential for decoding errors in a video bit stream after receiving a file seek or channel start command. Generally, a larger value of X increases the potential latency between receiving the file seek or channel start command and displaying pictures from the bit stream, but also increases the probability that the decoding of the bit stream will begin with an IDR or other I picture, thus potentially improving the quality of the displayed video stream. Generally, when Y pictures are automatically skipped, a larger value of Y increases the quality of the video stream that is eventually displayed in scenarios with missing references or stream corruptions, because a larger number of pictures that could contain errors are decoded and made available for reference but not displayed, because more corrupt reference pictures are likely to shift out of reference picture lists, and because more non-corrupt I pictures are likely available for reference. However, a larger value of Y also increases the latency between receiving the file seek or channel start command and displaying pictures.

In particular implementations, X and/or Y are set to effectively "unlimited" values (e.g., "unlimited" in the sense that the value is greater than or equal to the number of pictures in the bit stream, or in the sense that potential delays vastly exceed expectations of users). When X is an unlimited value, a decoder will search the bit stream until a picture is found that does not comprise inter-coded content (e.g., until an IDR or other I picture is found). When Y is an unlimited value and decoded pictures are selectively displayed, any decoded picture that has errors will not be displayed. Setting X and Y to unlimited values ensures that no pictures with errors will be displayed, but the latency could be potentially be the length of the video stream.

In other implementations, X and/or Y are limited values. Many combinations of values can be used. For example, in an example implementation where X=180 and Y=16, a decoder will search 180 pictures for an IDR or other I picture. If an IDR or other I picture is not found within 180 pictures, the decoder will start decoding from a P picture. The decoder will start displaying pictures after the first 16 pictures (including the P picture or first non-IDR I picture) are decoded, buffered and not displayed, even though the later pictures may still show errors. In another example implementation, where X is an unlimited value and Y is a limited value (e.g., 16), the decoder will search for an IDR or other I picture until one is found, but skips the display of the first Y pictures if the decoded pictures have any errors (e.g., from missing references and/or stream corruptions), then starts normal decoding.

In some implementations, the system uses a preroll flag to mark a decoded frame so that the decoded frame is not displayed. Generally, a user setting or defined system setting can control the number of preroll frames for which display is skipped at start up.

Example Triggering of Frame Number Gap Processing

At least some video coding standards employ picture identifiers that follow a decoding order for the pictures. For example, the H.264 standard uses the frame_num syntax element to indicate frame numbers according to decoding order. When decoding a usual bit stream (e.g., one that begins with an IDR picture), an H.264 decoder retrieves the frame_num value from a slice header for a slice of the IDR picture and determines the frame number for the IDR picture, effectively resetting frame numbering starting at 0. On the other hand, if decoding begins with a picture that is not an IDR picture (such as a P picture or non-IDR I picture after a channel start or file seek), the frame numbering begins from an undefined starting point, and decoding processes that use frame numbers may fail. For example, in the H.264 standard, reference picture ordering processes for P slices use frame numbers, and motion compensation for such P slices may fail when frame numbers are unavailable or out of place in a sequence. As another example, if a new video sequence starts with a non-IDR picture (in the H.264 standard, if the new pictures are characterized by a different sequence parameter set), frame numbering is invalid.

The method of FIG. 9 addresses these problems. Before decoding begins from a channel start or file seek, the system deliberately triggers H.264 decoding routines for handling gaps in frame numbers. The frame_num gap processing routines effectively reset the decoded picture buffer that stores reference pictures. Motion compensation references from pictures decoded after the channel start/file seek to reference pictures before the channel start/file seek are flagged, and the decoded pictures are classified as "missing references."

FIG. 9 shows an exemplary embodiment of a method 900 for using a substitute frame_num value to regulate decoding of video data after receiving a channel start or file seek instruction. The method 900 is an embodiment of the method 600 described above. A system such as the system 400 performs the method. In a method act 910, a system receives an instruction to perform a channel start or file seek for a video bit stream. Examples of different channel start instructions and file seek instructions are described with reference to FIG. 5. The system then performs operations to adjust the decoded picture buffer to a known state before decoding for the channel start or file seek.

In method act 920, an invalid value is assigned to a frame_num value that is fed to the decoder. Generally, the invalid frame_num value is selected to cause a gap in the frame_num values of decoded frames. In embodiments using the H.264 standard, the maximum allowed value MaxFrameNum of the frame_num for a picture is $$MaxFrameNum = 2^{(log2\_max\_frame\_num\_minus4+4)},$$

where $0 \leq log2\_max\_frame\_num\_minus4 \leq 12$. Accordingly, the maximum valid value for MaxFrameNum is $2^{16}$. The frame_num value is assigned a value higher than MaxFrameNum. In some implementations, the invalid value of frame_num is $2^{17}$. Other implementations use other invalid values, such as MaxFrameNum+1 or INT_MAX.

The invalid frame_num value is assigned, for example, to a dummy frame fed to the decoder before real decoding begins after the channel start or file seek. Or, the invalid frame_num value is assigned to a valid picture in the bit stream before the first picture to be decoded for the channel start or file seek, where the valid picture is not displayed. Or, the invalid frame_num value is assigned is assigned to a copy of the first picture or fed to the decoder in some other way. In any case, the invalid frame_num value is assigned creates a gap between frame_num values. This, in turn, causes the decoder to perform processing to compensate for the gap in the frame_num decoding information for the decoded pictures.

Returning to FIG. 9, at a method act 930, substitute frame_num values and samples values are generated for one or more placeholder reference pictures. In some cases, the placeholder reference pictures are stored in a buffer (e.g., a decoded picture buffer ("DPB")) and designated by their substitute frame_num values. At a method act 940, the placeholder reference picture(s) stored in the decoded picture buffer are marked as "non-existing" and "used for short-term reference" according to the frame_num gap processing routines of the H.264 standard. Accordingly, in at least some embodiments, the frame_num values are simulated, and reference picture buffers are initialized and ordered, as if the decoder had started decoding from an IDR picture. Reference pictures marked "used for short-term reference" may appear in one or more decoder reference picture lists, however, even though they are marked "non-existing" and will not actually be used for motion compensation.

At method act 950, the system begins decoding of pictures after the channel start or file seek. In some cases, the decoding begins from a P picture. In other cases, the decoding begins from a non-IDR I picture followed by one or more P pictures. During the decoding, pictures that refer to "non-existing" pictures in the decoded picture buffer, or that otherwise refer to reference pictures missing from the decoded picture buffer, are treated as corrupted due to missing references.

Marking reference pictures as "non-existing" using the frame_num gap processing (as in the method of FIG. 9) aggressively classifies decoded pictures as "missing references" after a channel start or file seek. It catches most or all corrupted pictures, where the corruption is due to missing reference pictures, from being displayed after receiving a channel seek or file start command. In rare cases, one or more pictures can be incorrectly classified as missing a reference or as corrupted when the basis for such classification is "non-existing" reference pictures in a reference picture list. For example, sometimes a slice or picture has "non-existing" pictures in its reference picture list, but the slice or picture does not actually refer to the "non-existing" pictures in motion compensation. In the H.264 standard, this could happen with special memory management command operations. In such cases, "non-existing" pictures are intentionally inserted into reference lists by the encoder, even though the slice or picture does not actually refer to missing reference pictures for purposes of motion compensation. In such cases, up to Y pictures are not displayed due to automatic skipping of corrupted pictures, as described above for the method 800, for example. This can be considered a "penalty" in cases when valid "non-existing" pictures (which are not used in motion compensation) in reference lists are classified as missing reference pictures.

Example Picture Order Count Generation

Some decoders utilize display order information for one or more decoded pictures. For example, an H.264 decoder uses picture order count ("POC") values to indicate display order for pictures in a bit stream. The POC values are used during decoding in various ways, especially for decoding of B slices. For example, reference picture lists for B slices are initialized based on POC values of reference pictures in the decoded picture buffer. According to the H.264 standard, upon decoding an IDR picture, the POC is set to 0, effectively resetting POC value determinations. In general, a POC value for a non-IDR picture can depend on syntax elements signaled in the bit stream, but it is calculated with reference to the POC of the preceding picture. On a channel start or file seek, the POC of the preceding picture is not available, so the POC values of pictures after the channel start or file seek are typically undefined and cannot simply be set from the POC value of the previous real picture decoded from the bit stream. Moreover, when placeholder reference pictures are generated after a channel start or file seek (e.g., using the method 900 of FIG. 9), frame_num values are simulated but POC values for the "non-existing" pictures are not defined.

The method of FIG. 10 addresses these problems by providing a way to predict and specify POC values for pictures upon a channel start or file seek. In some cases, the pictures that are assigned POC values include placeholder reference pictures created for decoded picture buffer simulation, where POC values are otherwise undefined. By predicting POC values for such reference pictures backward from a first decodable picture on a channel start or file seek, the system facilitates correct initialization of reference picture lists for B slices after the first decodable picture in decoding order.

FIG. 10 shows an exemplary embodiment of a method 1000 for using predicted picture order counts decoding a video bit stream after a channel start or file seek. A system such as the system 400 performs the method. At a method act 1010, a decoder receives a channel seek or file start instruction. Examples of different channel start instructions and file seek instructions are described with reference to FIG. 5. The system then performs operations to predict POC values used in decoding after the channel start or file seek.

In a method act 1020, a POC (First_POC) is determined for the first decodable picture identified in the bit stream after the channel start or file seek. For example, the first decodable picture is the picture at the start location indicated by the method 800 of FIG. 8.

In some embodiments, First_POC is assigned a value that is derived from one or more syntax elements of the bit stream and from an initial value upon the start of the decoding (which initial value is not necessarily correct). POC values for "non-existing" pictures are backward predicted from the First_POC, which helps ensure that the "non-existing" pictures in the decoded picture buffer use valid POC values. For example, if First_POC is x, the "non-existing" pictures could have POC values starting at x-N, where N should usually be larger than twice the DPB size in H.264 decoding implementations (for reasons explained below).

In a method act 1030, the POC values for one or more other pictures are determined. (These other pictures can be, for example, one or more placeholder pictures generated as a result of performing a method such as the method 900.) Generally, the other pictures are assigned POC values under the assumption that frame reordering does not occur across the first decodable picture (i.e., under the assumption that pictures before the first decodable picture in decoding order are also before the first decodable picture in output order). For example, the POC values are generated using backward prediction from the POC of the first decodable picture. For an H.264 decoder, a maximum number of reordered frames cannot be larger than the maximum DPB size. So, in embodiments where the DPB size is 16, any number smaller than First_POC—16×2 can be used for a POC value of an unavailable picture preceding the first decodable picture upon a channel start or file seek.

At a method act 1040, a B picture in the video bit stream is decoded using the determined POCs, among other information. The B picture comprises inter-coded content encoded with bi-directional motion compensation, and the predicted POC values are used, for example, to initialize reference picture lists for a B slice.

In some cases, backward prediction according to the method 1000 proceeds with at least two assumptions. First, it is assumed that no frame reordering happens across GOPs when an H.264 decoder starts decoding from an I picture. That is, it is assumed that no picture before the I picture in decoding order follows the I picture in output order. In practice, this assumption is generally valid. Second, it is assumed that no frame reordering happens across a starting P picture, if the first decodable picture is a P picture. In practice, this second assumption is invalid from time to time. However, in such cases, when the H.264 decoder starts decoding from a P picture, macroblocking and corruptions are likely or very likely for other reasons such as missing references. Also, an H.264 decoder usually does not start decoding from a P picture because an I picture is usually available within a tolerable latency.

Experimental Results

Generally, using POC backward prediction on channel start or file seek allows for correct initialization of B picture reference lists in most scenarios. The empirical results from one set of tests showed that in more than 95% of cases B picture reference lists are correctly initialized using the disclosed techniques.

Other experimental results show that combinations of two or more of the above methods can dramatically reduce the probability of corruption or macroblocking occurring in displayed video after a channel start or file seek. Using the methods 800, 900 and 1000 in combination for an H.264 decoder in test scenarios (with settings of 180 and 16 for the key picture count parameter and display skip parameter, respectively) reduced the probability of such errors to less than 5%, while keeping latency to tolerable levels. Without using POC prediction techniques for unavailable pictures (e.g., as in the method 1000), the probability of such errors occurring was 20-30%. Without using frame_num gap processing to adjust decoded picture buffer state before decoding (e.g., as in the method 900), the probability of such errors occurring was more than 50%. Collectively, the methods 800, 900 and 1000 improve the user experience when starting a new channel of video delivered over a network connection, when switching locations in a file during playback, or in other channel start or file seek scenarios.

Example Computing Environments

Figure 11:
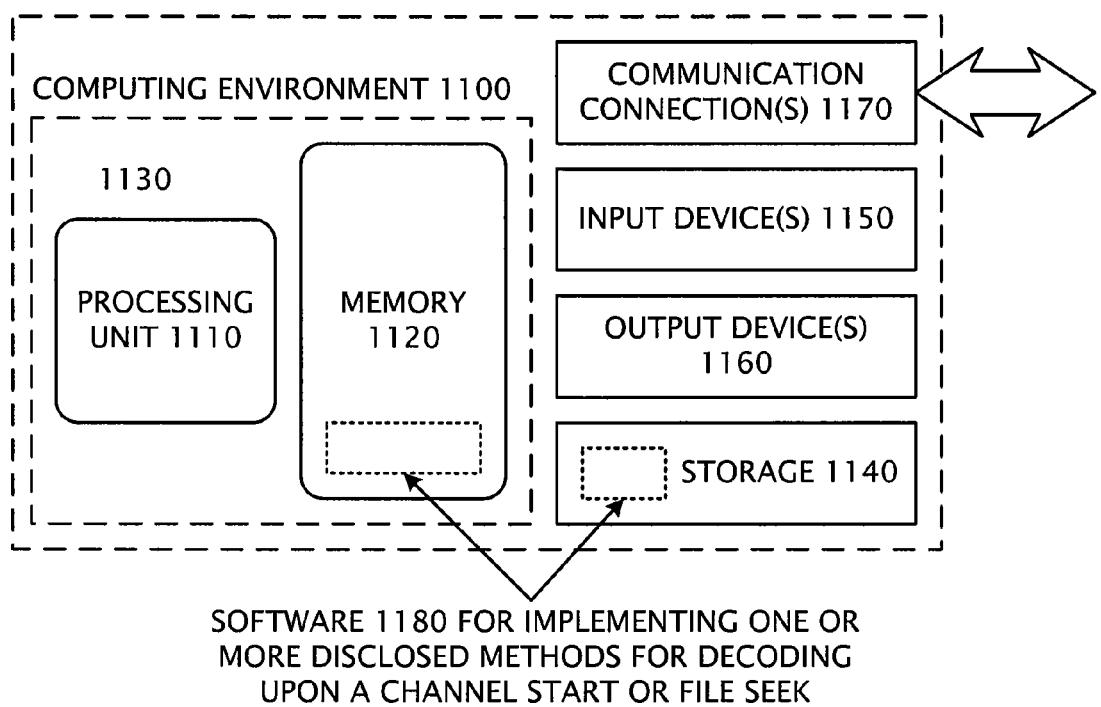
FIG. 11 is a block diagram of an exemplary computing environment for use with one or more of the disclosed technologies.

FIG. 11 illustrates a generalized example of a suitable computing environment 1100 in which at least some of the described embodiments can be implemented. The computing environment 1100 is not intended to suggest any limitation as to scope of use or functionality, as the methods described herein can be implemented in diverse general-purpose or special-purpose computing environments (e.g., a general-purpose computer, or special-purpose computing device such as a digital video receiver, set-top box or mobile device).

With reference to FIG. 11, the computing environment 1100 includes at least one processing unit 1110 and memory 1120. In FIG. 11, this most basic configuration 1130 is included within a dashed line. The processing unit 1110 executes computer-executable instructions and can be a real or a virtual processor. In a multi-processor system, multiple processing units execute computer-executable instructions to increase processing power. The memory 1120 can be volatile memory (e.g., registers, cache, RAM), non-volatile memory (e.g., ROM, EEPROM, flash memory, etc.), or some combination of the two. The memory 1120 stores software 1180 implementing one or more of the described decoding techniques upon a channel start or file seek operation.

The computing environment can have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The storage 1140 can be removable or non-removable, and includes magnetic disks, magnetic tapes or cassettes, CD-ROMs, DVDs, or any other tangible storage medium which can be used to store information and which can be accessed within the computing environment 1100. The storage 1140 can store instructions for the software 1180 implementing any of the one or more of the described techniques for decoding upon a channel start or file seek operation.

The input device(s) 1150 can be a touch input device such as a keyboard, mouse, pen, or trackball, a voice input device, a scanning device, or another device that provides input to the computing environment 1100. The output device(s) 1160 can be a display, printer, speaker, CD-writer, or another device that provides output from the computing environment 1100.

The communication connection(s) 1170 enable communication over a communication medium to another computing entity. The communication medium is not a storage medium but conveys information such as computer-executable instructions, encoded media data, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier. By way of example, and not limitation, with the computing environment 1100, computer-readable media include tangible computer-readable storage media such as memory 1120 and storage 1140.

In view of the many possible embodiments to which the principles of the disclosed technologies may be applied, it should be recognized that the illustrated embodiments are only preferred examples of the disclosed technologies and should not be taken as limiting the scope of the invention. Rather, the scope of the invention is defined by the following claims. We therefore claim as our invention all that comes within the scope and spirit of these claims.

We claim:

1. One or more computer-readable storage media containing instructions which, when executed by a processor, cause the processor to perform video playback upon a channel start or file seek, the video playback comprising:
   receiving an instruction to perform a channel start or file seek for a bit stream of encoded video data;
   based at least in part on the instruction to perform the channel start or file seek, generating a frame identifier value that results in a gap between frame identifier values;
   upon detection of the gap between frame identifier values:
      generating substitute data for one or more reference pictures; and
      marking the one or more reference pictures as non-existent for purposes of reference picture management; and
   decoding plural pictures after the channel start or file seek using at least part of the bit stream of encoded video data.

2. The one or more computer-readable storage media of claim 1, wherein the frame identifier value is an invalid frame number, wherein the gap in identifier values is a gap in frame numbers, and wherein the substitute data comprise sample values for the one or more reference pictures.

3. The one or more computer-readable storage media of claim 1, wherein the video playback further comprises, upon detection of the gap between frame identifier values:
   determining a set of frame identifier values for the one or more reference pictures; and
   for each frame identifier value in the set of identifier values, performing the generating and the marking for one of the one or more reference pictures associated with the frame identifier value, wherein the substitute data for the one or more reference pictures provide one or more placeholder representations of the one or more reference pictures, respectively, and wherein the marking of the one or more reference pictures as non-existent makes the one or more placeholder representations unavailable for reference in motion compensation during the decoding of the plural pictures after the channel start or file seek.

4. The one or more computer-readable storage media of claim 1, wherein the video playback is performed by a digital video receiver, set-top box, mobile device or a general purpose computer configured to perform the video playback.

5. One or more computer-readable storage media containing instructions which, when executed by a processor, cause the processor to perform video playback upon a channel start or file seek, the video playback comprising:
   receiving an instruction to perform a channel start or file seek for a bit stream of encoded video data;
   based at least in part on the instruction to perform the channel start or file seek, predicting display order data for one or more pictures that precede a given picture in a decoding order, the one or more preceding pictures including a first decodable picture, the first decodable picture being decoded after the channel start or file seek; and
   decoding the given picture using at least part of the encoded video data from the bit stream, wherein the given picture comprises inter-coded content encoded with bi-directional motion compensation, and wherein the decoding the given picture includes using the predicted display order data.

6. The one or more computer-readable storage media of claim 5, wherein the predicting display order data comprises:
   determining a display order count for the first decodable picture; and
   for each of one or more other preceding pictures of the one or more preceding pictures:
      adjusting the display order count; and
      assigning the adjusted display order count to the other preceding picture.

7. The one or more computer-readable storage media of claim 5, wherein the predicting display order data comprises performing backward prediction from a display order count assigned to the first decodable picture, the first decodable picture being decoded after the channel start or file seek, wherein the one or more other preceding pictures further include one or more generated placeholder reference pictures.

8. The one or more computer-readable storage media of claim 5, wherein the predicting display order data is based at least in part on size for a reference picture buffer for decoded pictures.

9. The one or more computer-readable storage media of claim 8, wherein the display order data includes a picture order count for each of the one or more preceding pictures.

10. The one or more computer-readable storage media of claim 5, wherein the prediction of display order data assumes (a) that the given picture and the first decodable picture are part of a first group of pictures, and (b) that any other preceding picture is part of another group of pictures that precedes the first group of pictures and includes no pictures reordered to follow the first decodable picture in display order.

11. The one or more computer-readable storage media of claim 5, wherein the video playback is performed by a digital video receiver, set-top box, mobile device or a general purpose computer configured to perform the video playback.

12. In a video playback system, a method of video playback upon a channel start or file seek, the method comprising:
   receiving an instruction to perform a channel start or file seek for a bit stream of encoded video data;
   based at least in part on the instruction to perform the channel start or file seek, predicting display order data for one or more pictures that precede a given picture in a decoding order, the one or more preceding pictures including a first decodable picture, the first decodable picture being decoded after the channel start or file seek; and decoding the given picture using at least part of the encoded video data from the bit stream, wherein the given picture comprises inter-coded content encoded with bi-directional motion compensation, and wherein the decoding the given picture includes using the predicted display order data.

13. The method of claim 12, wherein the predicting display order data comprises:
   determining a display order count for the first decodable picture; and
   for each of one or more other preceding pictures of the one or more preceding pictures:
      adjusting the display order count; and
      assigning the adjusted display order count to the other preceding picture.

14. The method of claim 12, wherein the predicting display order data comprises performing backward prediction from a display order count assigned to the first decodable picture, the first decodable picture being decoded after the channel start or file seek, wherein the one or more other preceding pictures further include one or more generated placeholder reference pictures.

15. The method of claim 12, wherein the predicting display order data is based at least in part on size for a reference picture buffer for decoded pictures.

16. The method of claim 15, wherein the display order data includes a picture order count for each of the one or more preceding pictures.

17. The method of claim 12, wherein the prediction of display order data assumes (a) that the given picture and the first decodable picture are part of a first group of pictures, and (b) that any other preceding picture is part of another group of pictures that precedes the first group of pictures and includes no pictures reordered to follow the first decodable picture in display order.

18. The method of claim 12, further comprising:
   based at least in part on the instruction to perform the channel start or file seek, generating a frame identifier value that results in a gap between frame identifier values; and
   upon detection of the gap between frame identifier values:
      generating substitute data for one or more reference pictures; and
      marking the one or more reference pictures as non-existent for purposes of reference picture management.

19. The method of claim 18, wherein the frame identifier value is an invalid frame number, wherein the gap in identifier values is a gap in frame numbers, and wherein the substitute data comprise sample values for the one or more reference pictures.

20. The method of claim 18, wherein the method further comprises, upon detection of the gap between frame identifier values:
   determining a set of frame identifier values for the one or more reference pictures; and
   for each frame identifier value in the set of identifier values, performing the generating and the marking for one of the one or more reference pictures associated with the frame identifier value, wherein the substitute data for the one or more reference pictures provide one or more placeholder representations of the one or more reference pictures, respectively, and wherein the marking of the one or more reference pictures as non-existent makes the one or more placeholder representations unavailable for reference in motion compensation during decoding of the plural pictures after the channel start or file seek.

* * * * *